(12) United States Patent
Amano

(10) Patent No.: US 7,860,647 B2
(45) Date of Patent: Dec. 28, 2010

(54) GUIDE REPORT DEVICE, SYSTEM THEREOF, METHOD THEREOF, PROGRAM FOR EXECUTING THE METHOD, AND RECORDING MEDIUM CONTAINING THE PROGRAM

(75) Inventor: Kouji Amano, Tokyo (JP)

(73) Assignee: Pioneer Corporation, Tokyo (JP)

( * ) Notice: Subject to any disclaimer, the term of this patent is extended or adjusted under 35 U.S.C. 154(b) by 1033 days.

(21) Appl. No.: 11/630,518

(22) PCT Filed: Jun. 27, 2005

(86) PCT No.: PCT/JP2005/011719

§ 371 (c)(1),
(2), (4) Date: Dec. 21, 2006

(87) PCT Pub. No.: WO2006/001413

PCT Pub. Date: Jan. 5, 2006

(65) Prior Publication Data

US 2008/0033640 A1    Feb. 7, 2008

(30) Foreign Application Priority Data

Jun. 25, 2004    (JP)    ............... 2004-188701

(51) Int. Cl.
G01C 21/30    (2006.01)
G01C 21/32    (2006.01)
(52) U.S. Cl. .............. 701/209; 701/117; 701/118; 701/119; 701/200; 701/204; 701/207; 701/208; 701/210; 701/211; 340/905; 340/907; 340/990; 340/994; 340/995; 340/995.13; 340/995.19

(58) Field of Classification Search ........... 701/209, 701/200, 211, 210, 117, 207, 118, 119, 204, 701/208; 340/990, 995.1, 905, 907, 994, 340/99.13, 995.19
See application file for complete search history.

(56) References Cited

U.S. PATENT DOCUMENTS 6,529,819 B2 * 3/2003 Baur et al. ............... 701/117

(Continued)

FOREIGN PATENT DOCUMENTS

JP    9-113290    5/1997

(Continued)

OTHER PUBLICATIONS

Office Action dated Jan. 5, 2010 corresponding to Japanese patent application No. 2006-528657 with English translation.

(Continued)

*Primary Examiner*—Khoi Tran
*Assistant Examiner*—Jaime Figueroa
(74) *Attorney, Agent, or Firm*—Kratz, Quintos & Hanson, LLP

(57) ABSTRACT

A navigation device 100 includes: a map information acquirer for acquiring map information; a current position acquirer for acquiring current position information about a current position of a mobile body; a destination acquirer for acquiring destination information about a destination; an information retriever for acquiring plural pieces of parking information about parking lots to park the mobile body based on the map information; a route setting section for setting travel routes from the current position to the parking lots and travel routes from the parking lots to the destination; and a display controller for controlling a terminal display section 140 to display any one of the parking lots and at least one of the travel routes based on the travel routes.

30 Claims, 24 Drawing Sheets

U.S. PATENT DOCUMENTS

| | | | |
|---|---|---|---|
| 6,643,581 B2 * | 11/2003 | Ooishi | 701/207 |
| 6,813,556 B2 * | 11/2004 | Watanabe | 701/117 |
| 2002/0049534 A1 * | 4/2002 | Yuda et al. | 701/209 |
| 2003/0083813 A1 * | 5/2003 | Park | 701/210 |
| 2004/0098571 A1 * | 5/2004 | Falcon | 713/1 |
| 2005/0131631 A1 * | 6/2005 | Nakano et al. | 701/200 |

FOREIGN PATENT DOCUMENTS

| | | |
|---|---|---|
| JP | 2002-286480 | 10/2002 |
| JP | 2002-298175 | 10/2002 |
| JP | 2002-303520 | 10/2002 |
| JP | 2003-57057 | 2/2003 |
| JP | 2003-148983 | 5/2003 |
| JP | 2003-222527 | 8/2003 |
| JP | 2003-302234 | 10/2003 |

OTHER PUBLICATIONS http://www.dvd-rakunayi.com/function/around/index.htlm; Jun. 11, 2004; 3 Sheets (in color)/Partial translation./Discussed in the specification.

* cited by examiner

FIG.2
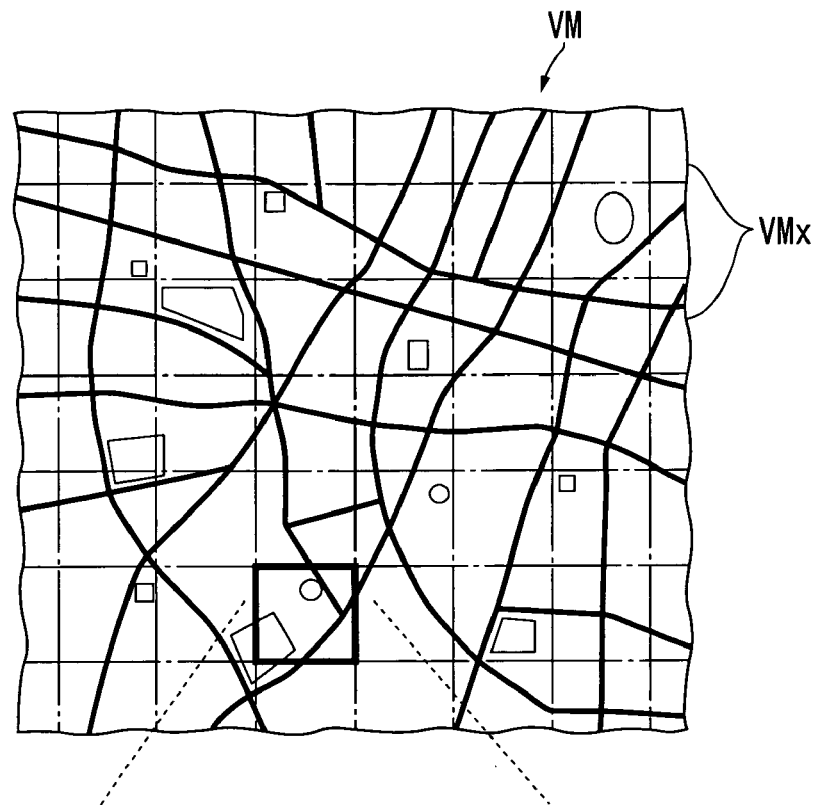
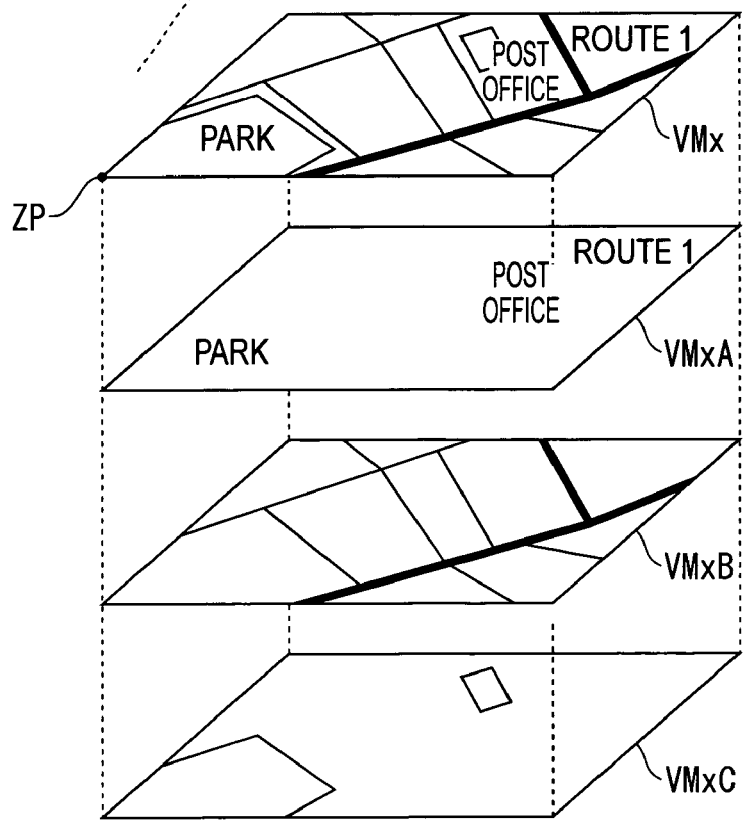

FIG. 4

TRAFFIC CONDITION PREDICTION TABLE

| DATE CLASSIFICATION | WORKDAY | SATURDAY | SUNDAY/ LEGAL HOLIDAY | SPECIAL DAY 1 | SPECIAL DAY 2 | ... | DAY BEFORE LONG HOLIDAY | FIRST DAY OF LONG HOLIDAY | MIDDLE DAY OF LONG HOLIDAY | LAST DAY OF LONG HOLIDAY | DAY BEFORE LAST DAY OF LONG HOLIDAY |
|---|---|---|---|---|---|---|---|---|---|---|---|
| DATE-CLASSIFICATION ID | ID1 | ID2 | ID3 | ID4 | ID5 | ID6 | ID7 | ID8 | ID9 | ID10 | ID11 |
| | TIME-SERIES DATA | TIME-SERIES DATA | ... | | | ... | | | | | ... |

11 — DATE-CLASSIFICATION ID
12i — TIME-SERIES DATA

FIG. 12

| PARKING LOT | ESTIMATED PARKING ARRIVAL TIME | WAIT TIME AT PARKING LOT | TRAVEL TIME TO DESTINATION | TRAVEL DISTANCE TO DESTINATION | TRAVEL COST TO DESTINATION | TRAVEL MEANS TO DESTINATION | ESTIMATED DESTINATION ARRIVAL TIME | PARKING FEE | SERVICE INFORMATION |
|---|---|---|---|---|---|---|---|---|---|
| PARKING LOT P-a | 13:00 | 60 MINUTES | 1 MINUTE | 50m | — | WALK | 14:01 | 500 YEN/HOUR | PARKING FEE DISCOUNT SERVICE |
| PARKING LOT P-b | 12:30 | 15 MINUTES | 30 MINUTES | 2,000m | — | WALK | 13:15 | 450 YEN/HOUR | TICKET SERVICE BETWEEN STATION A AND STATION B RESERVATION SERVICE BICYCLE RENTAL SERVICE |
| PARKING LOT P-c | 12:20 | 0 MINUTE | 30 MINUTES | 3,000m | 150YEN | TRAIN, WALK | 12:50 | 150 YEN/HOUR | RESERVATION SERVICE COURTESY TICKET SERVICE |

FIG.19

PARKING CONDITION INFORMATION TABLE 50

| PARKING SPACE ID (51) | PARKING CONDITION INFORMATION (52) |
|---|---|
| a-1 | PARKED |
| a-2 | VACANT |
| a-3 | NOT AVAILABLE |
| a-4 | RESERVED |
| ⋮ | ⋮ |

| SERVICE ID (61) | SERVICE CONTENT INFORMATION (62) |
|---|---|
| 1 | PARKING RESERVATION |
| 2 | SALE OF TICKET |
| 3 | DISCOUNT SERVICE FOR SHOP○○ |
| 4 | SALE OF COUPON TICKET BETWEEN STATION ○○ AND STATION △△ |
| 5 | DISCOUNT SERVICE FOR HOTEL□□ |
| 6 | VEHICLE WASH SERVICE |
| ⋮ | ⋮ |

FIG. 21

SERVICE RESERVATION INFORMATION TABLE 70

| RESERVATION ID 72 | SERVICE ID 73 | APPLICANT INFORMATION 74 | ESTIMATED ARRIVAL TIME INFORMATION 75 | PARKING RESERVATION INFORMATION 76 |
|---|---|---|---|---|
| 1 | 1,2 | ○○○○ | 4/5 12:30 | a-4 |
| 2 | 3,4 | □□□□ | 4/5 13:15 | × |
| 3 | 1,5 | △△△△ | 4/5 14:20 | a-20 |
| 4 | 1,6 | ××× × | 4/5 20:00 | b-1 |
| ... | ... | ... | ... | ... |

US 7,860,647 B2

GUIDE REPORT DEVICE, SYSTEM THEREOF, METHOD THEREOF, PROGRAM FOR EXECUTING THE METHOD, AND RECORDING MEDIUM CONTAINING THE PROGRAM

TECHNICAL FIELD

The present invention relates to a guidance notifying device for notifying a traffic condition of a mobile body, its system, its method, a program executing the method, and a recording medium storing the program.

BACKGROUND ART

There has been conventionally known an in-vehicle navigation device that acquires traffic information (VICS data) on traffic accidents and traffic jams etc. from a Vehicle Information Communication System (VICS) and superimposes indications representing the traffic condition such as the traffic accidents and the traffic jams on map information displayed on a screen of a display unit to notify users of the traffic condition.

As an example of such in-vehicle navigation device, there has been known an arrangement that predicts and notifies current and future traffic conditions with the use of statistical traffic-jam information data obtained by statistically processing the past traffic-jam information (see, for example, Patent Document 1).

An in-vehicle navigation device disclosed in Patent document 1 notifies statistical traffic-jam information according to time factors such as time and day of the week based on the statistical traffic-jam information data by superimposing the information on map information in various expressions corresponding to the traffic-jam condition. With the notified time and day of the week, users can predict current and possible future traffic jams.

As another example, there has been known an arrangement in which parking information is superimposed on map information to provide notification thereof (see, for instance, Nonpatent Document 1). The arrangement disclosed in Nonpatent Document 1 provides guidance such that, for instance, when a parking lot is full, it is indicated in red to show unavailability thereof, and when a parking lot has vacancy, it is indicated in blue to show availability thereof.

[Patent Document 1] Japanese Laid-Open Patent Publication No. Hei 9-113290 (right column of page 3 to left column of page 7).

[Nonpatent Document 1]
http://www.dvd-rakunavi.com/function/around/index.html (as of Jun. 11, 2004).

DISCLOSURE OF THE INVENTION

Problems to be Solved by the Invention

However, with the conventional device disclosed in Patent Document 1 described above, when travel routes to a destination are searched for, a travel route to the destination might be set even when a traffic jam arises around the destination. Due to the arrangement, a user might need to re-search for a parking lot when the user arrives at the destination. In addition, in a case where the user gets involved in a traffic jam around the destination or in a case where the user cannot find a parking lot with vacancy even after he/she arrives at around the destination, he/she might be late to arrive at around the destination. Accordingly, the user has to retrieve a parking lot before he/she arrives at the destination to avoid the traffic jam. Therefore, a device capable of supporting more proper travel has been desired.

An object of the present invention is to provide a guidance notifying device capable of supporting a proper travel, its system, its method, its program, and a recording medium storing the program.

Means for Solving the Problems

A guidance notifying device according to an aspect of the present invention includes: a map information acquirer for acquiring map information; a current position acquirer for acquiring current position information about a current position of a mobile body, a destination acquirer for acquiring destination information about a destination; a facility information acquirer for acquiring plural pieces of facility information about accommodating facilities that accommodate the mobile body based on the map information; a route setting section for setting first travel routes from the current position to the accommodating facilities and second travel routes from the accommodating facilities to the destination; and a notification controller for controlling a notifier to notify one of the accommodating facilities and at least one of the first and the second travel routes based on the first and the second travel routes.

A guidance notifying system according to another aspect of the present invention includes: a server unit that stores map information in a storage section; and a terminal unit including the above-described guidance notifying device of the present invention, the terminal unit acquiring the map information from the server unit via a network.

A guidance notifying system according to still another aspect of the present invention includes: a terminal unit including the above-described guidance notifying device of the present invention; and a service server unit that is connected with the terminal unit via a network, the service server unit receiving service request information about reservation or cancellation of reservation of services of the accommodating facilities, the service request information transmitted from the terminal unit.

A guidance notifying method according to yet another aspect of the present invention includes: acquiring map information, current position information about a current position of a mobile body, and destination information about a destination; acquiring plural pieces of facility information about accommodating facilities for accommodating the mobile body based on the map information; setting a first route from the current position to each of the accommodating facilities and a second route from each of the accommodating facilities to the destination; and notifying with a notifier one of the accommodating facilities and at least one of the first travel route and the second travel route based on the first travel route and the second travel route.

According to further aspect of the present invention, a guidance notifying program operates a computing unit as the above-described guidance notifying device of the present invention.

According to still further aspect of the present invention, a guidance notifying program operates a computing unit to perform the above-described guidance notifying method of the present invention.

According to yet further aspect of the present invention, a recording medium stores the above-described guidance notifying program of the present invention in a manner readable by a computing unit.

BRIEF DESCRIPTION OF DRAWINGS

FIG. 2 is a conceptual diagram schematically showing a table structure of display data of map information according to the first embodiment;

FIG. 4 is a conceptual diagram schematically showing a table structure of data in a traffic condition prediction table according to the first embodiment;

FIG. 12 is a schematic diagram showing a parking information list displayed in selecting a parking lot according to the first embodiment;

FIG. 19 is a conceptual diagram schematically showing a parking condition information table stored in a storage section of the service server unit according to the second embodiment;

FIG. 20 is a conceptual diagram schematically showing a service content information table stored in the storage section of the service server unit according to the second embodiment;

FIG. 21 is a conceptual diagram schematically showing a service reservation information table stored in the storage section of the service server unit according to the second embodiment;

EXPLANATION OF CODES

- 100 navigation device as guidance notification device
- 140 terminal display section as notifier
- 150 sound output section as notifier
- 191A current position acquirer
- 192 guidance notification controller as guidance controller, service information acquirer, additional service information acquirer, transportation fee information acquirer
- 191B destination recognizer
- 192B display controller also functioning as map information acquirer
- 194A traffic jam condition recognizer also functioning as traffic information recognizer, statistical traffic information acquirer and traffic-jam-condition change recognizer
- 194B parking condition recognizer as facility accommodation condition recognizer
- 195A route searcher as route setting section
- 195C travel time computing section also functioning as travel distance computing section and time computing section
- 196 information retriever also functioning as facility information acquirer and public transportation information acquirer
- 200 navigation system as guidance notifying system
- 300 network
- 400 terminal unit
- 431 service application information generator as additional service information acquirer
- 500 server unit
- 600 service server unit

BEST MODE FOR CARRYING OUT THE INVENTION

First Embodiment

Now, a first embodiment of the present invention will be described with reference to the attached drawings.

A navigation device of this embodiment is an example of a guidance notifying device of the present invention, which is designed to navigate a mobile body (e.g. a vehicle) for driving as a travel progress thereof. It should be noted that the guidance notifying device of the present invention is not necessarily designed to navigate a vehicle for the driving thereof, but may be so designed to notify a traffic condition for any type of mobile body.

[Arrangement of Navigation Device]

Figure 1:
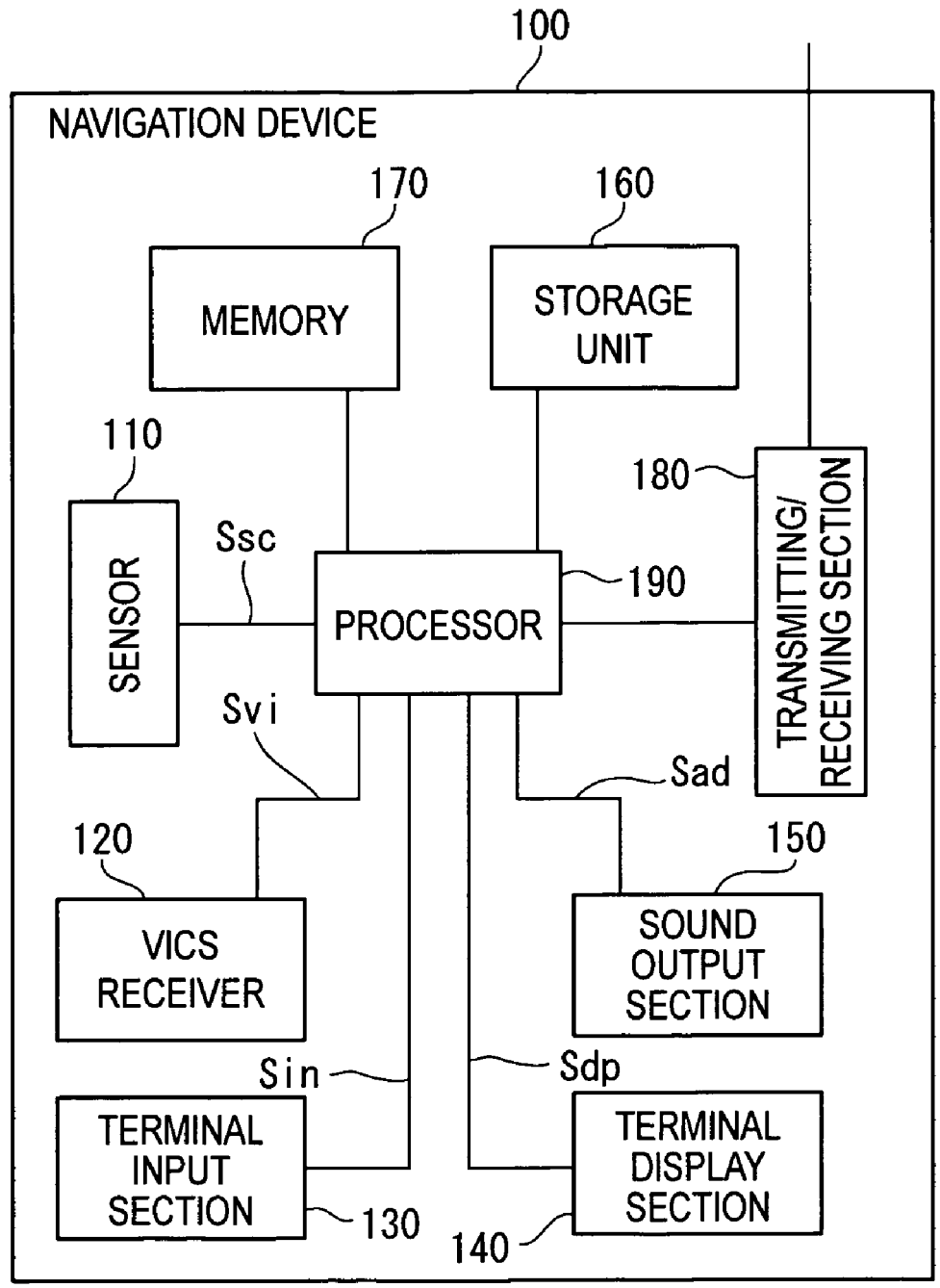
FIG. 1 is a block diagram schematically showing an arrangement of a navigation device according to a first embodiment of the present invention.

Referring to FIG. 1, the reference numeral 100 denotes the navigation device as the guidance notifying device. The navigation device 100 notifies guidance on a travel along with a travel progress of a mobile body (e.g. a vehicle). The mobile body is not limited to vehicles, but includes any type of mobile body such as aircrafts and ships. The navigation device 100 may be, for example, an in-vehicle unit installed in a vehicle as a mobile body, a portable unit, a PDA (Personal Digital Assistant), a portable phone, a PHS (Personal Handyphone System) or a portable personal computer. The navigation device 100 searches for and displays information about a current position and a destination, a route to the destination, predetermined shops nearby, and information about services provided by the shops based on map information stored in the navigation device 100. As shown in FIG. 1, the navigation device 100 has a sensor 110, a VICS (Vehicle Information Communication System) receiver 120 as a traffic information acquirer, a terminal input section 130, a terminal display section 140 as a notifier, a sound output section 150 as a notifier, a storage unit 160, a memory 170, a transmitting/receiving section 180, a processor 190 and so on.

The sensor 110 detects the travel progress of a mobile body (e.g. a vehicle), i.e., the current position and the driving status, and outputs the travel progress as a predetermined signal Ssc to the processor 190. The sensor 110 typically has a GPS (Global Positioning System) receiver (not shown) and various sensors such as a speed sensor, an azimuth sensor and an acceleration sensor (each not shown).

The GPS receiver receives electric navigation waves output from a GPS satellite (not shown), which is an artificial satellite, via a GPS antenna (not shown). Then, the GPS receiver computes simulated coordinate values of the current position based on a signal corresponding to the received electric navigation waves and outputs the simulated coordinate values as GPS data to the processor 190.

The speed sensor of the sensor 110 is arranged on the mobile body (e.g. a vehicle) so as to detect driving speed and actual acceleration of the vehicle based on a signal that varies depending on travel speed or driving speed of the vehicle. The speed sensor reads a pulse signal, a voltage value and the like output in response to the revolution of axles and wheels of the vehicle. Then, the speed sensor outputs detection information such as the read pulse signal and voltage value to the processor 190. The azimuth sensor is arranged on the vehicle and provided with a so-called gyro-sensor (not shown) so as to detect the azimuth of the vehicle, i.e., a driving direction for which the vehicle is heading. The azimuth sensor outputs a signal representing detection information about the detected driving direction to the processor 190. The acceleration sensor is arranged on the vehicle so as to detect the acceleration of the vehicle in the driving direction thereof. The acceleration sensor converts the detected acceleration into a sensor output value, which is detection information such as the pulse and the voltage, and then outputs the sensor output value to the processor 190.

The VICS receiver 120 has a VICS antenna (not shown) and acquires information about the traffic via the VICS antenna. More specifically, the VICS receiver 120 acquires traffic information (hereinafter referred to as VICS data) about traffic jams, traffic accidents, constructions, traffic controls and so on from the VICS (not shown) by way of a beacon, FM multiplex broadcasting or the like. The acquired traffic information is output as a predetermined signal Svi to the processor 190.

The VICS data is structured in a table typically containing a plurality of following conceptual items formed as a single data structure.

traffic-jam level: traffic-jammed, crowded, smooth, etc.

top position information of traffic jam length information of traffic jam link travel time information: travel time required for a vehicle to pass through a VICS link (distance between intersections)

zone travel time information: travel time required for a vehicle to pass through a predetermined zone longer than a VICS link information about traffic controls, causes thereof, controlled areas information about vacancy of parking lot information about service areas and parking areas other information The terminal input section 130, which may be a keyboard, a mouse or the like, has various operation buttons and operation knobs (each not shown) to be used for input operations. The operation buttons and the operation knobs are used to input, for example, the settings for the operations of the navigation device 100. More specifically, the operation buttons and the operation knobs may be used: to set the type of information to be acquired and acquiring criteria; to set a destination; to retrieve information; and to display the driving status (travel progress) of the vehicle. When the settings are input, the terminal input section 130 outputs a predetermined signal Sin to the processor 190 so as to apply the settings. In place of the input operation using the operation buttons and the operation knobs, the terminal input section 130 may employ input operation using a touch panel arranged on the terminal display section 140, sound input operation and the like for inputting various settings.

The terminal display section 140, under the control of the processor 190, displays a signal Sdp representing image data sent from the processor 190. Examples of the image data may include image data representing map information and retrieval information, TV image data received by a TV receiver (not shown), image data stored in an external device or recording media such as an optical disc, a magnetic disc or a memory card and read by a drive or a driver, and image data in the memory 170. The terminal display section 140 may typically be a liquid-crystal panel, an organic EL (Electro Luminescence) panel, a PDP (Plasma Display Panel), or a CRT (Cathode-Ray Tube).

The sound output section 150 has an audio section such as a speaker (not shown). The sound output section 150, under the control of the processor 190, outputs various signals Sad as sounds from the audio section. The various signals Sad represent sound data etc. sent from the processor 190. Information output as sounds, which may be the driving direction and the driving status of the vehicle and traffic condition, are notified to occupants such as a driver of the vehicle for navigating the vehicle. The audio section may output TV sound data received by the TV receiver and sound data stored in recording media or the memory 170. In place of the audio section provided to the sound output section 150, the sound output section 150 may use an audio section equipped on the vehicle.

Figure 3:
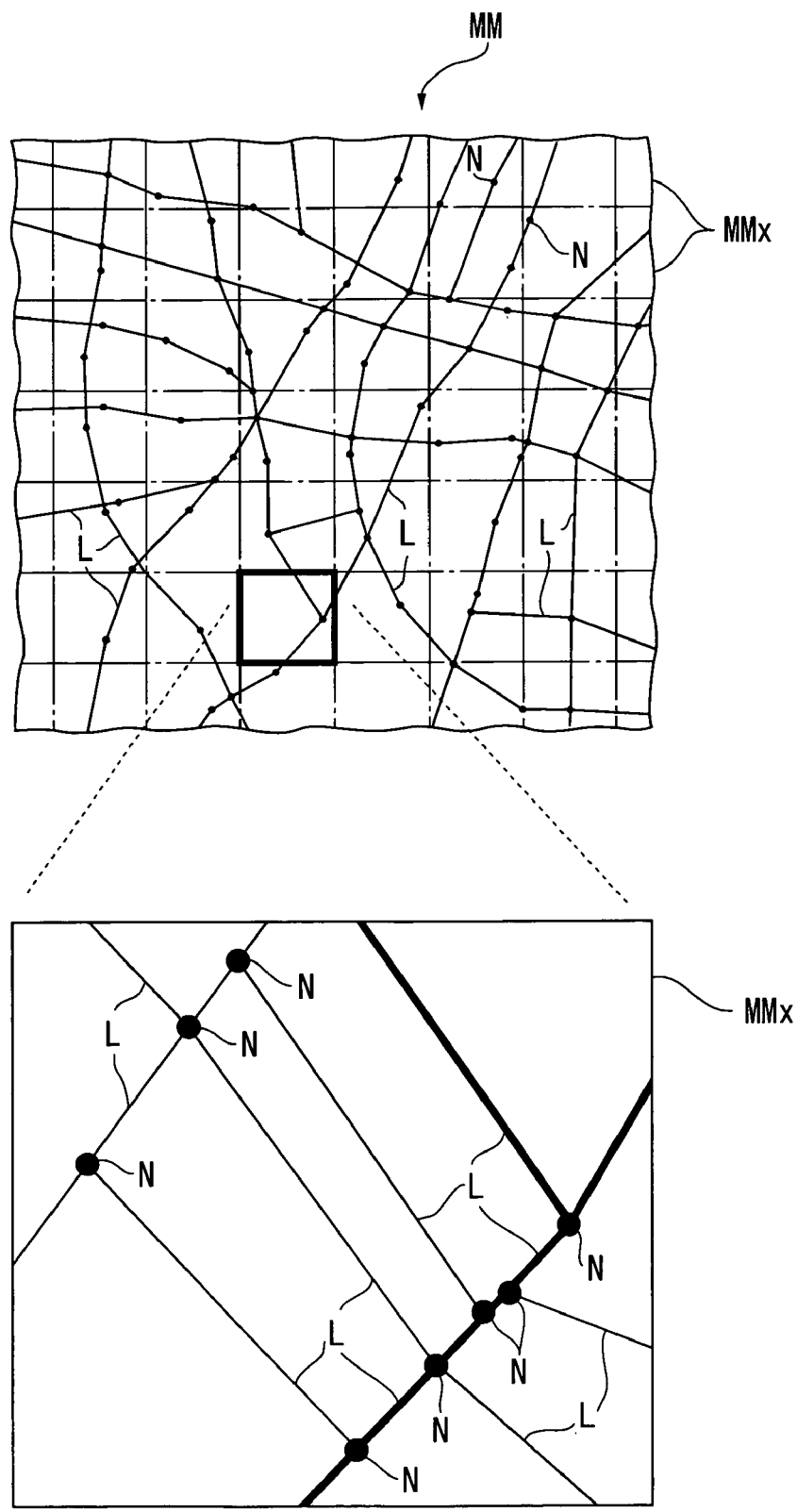
FIG. 3 is a conceptual diagram schematically showing a table structure of matching data of the map information according to the first embodiment.
Figure 5:
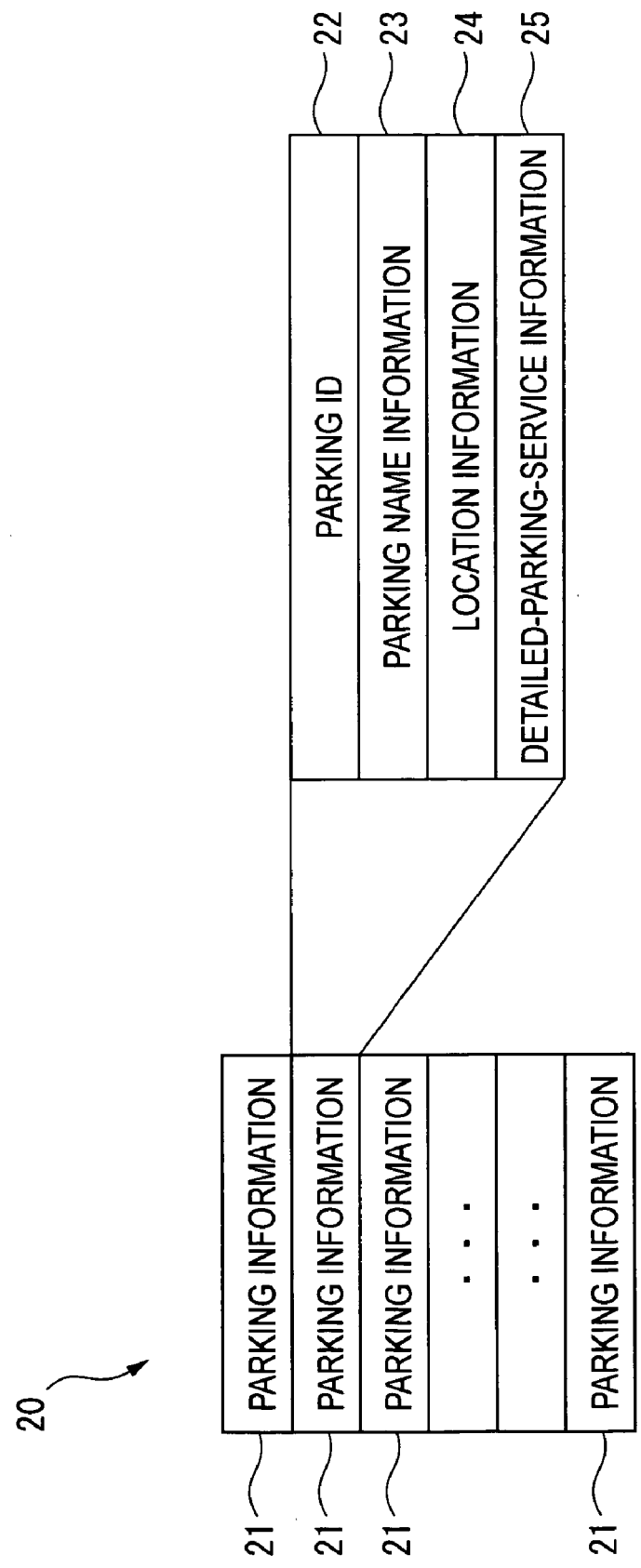
FIG. 5 is a conceptual diagram schematically showing a table structure of data in a parking information table according to the first embodiment.
Figure 6:
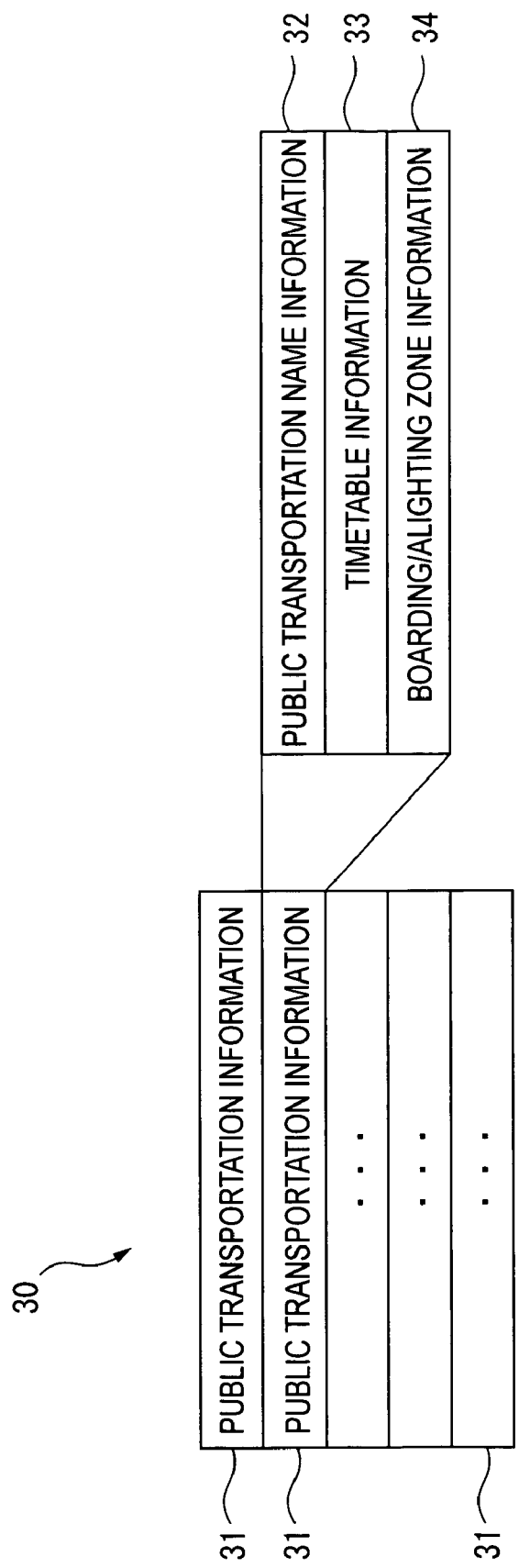
FIG. 6 is a conceptual diagram schematically showing a table structure of data in a public transportation information table according to the first embodiment.

The storage unit 160 readably stores map information as shown in FIGS. 2 and 3, a traffic condition prediction table 10 as shown in FIG. 4, a parking information table 20 as shown in FIG. 5, public transportation information as shown in FIG. 6, etc. The storage unit 160 may include drives or drivers for readably storing data on recording medium such as a HD (Hard Disk), a DVD (Digital Versatile Disc), an optical disc and a memory card.

The map information includes display data VM, which is so-called POI (Point Of Interest) data as shown in FIG. 2, matching data MM as shown in FIG. 3, route-search map data and the like.

The display data VM includes, for example, plural pieces of display mesh information VMx, each having a unique number. To be more specific, the display data VM is divided into the plural pieces of display mesh information VMx, each relating to an area. The display data VM is constituted from the plural pieces of display mesh information VMx continuously arranged in a matrix form. The display mesh information VMx may be further divided into plural pieces of display mesh information VMx to be contained in a lower layer, each relating to a smaller area. Each display mesh information VMx has a rectangular shape with each side thereof having a predetermined length, which is reduced relative to the actual geographic length according to the map scale. A predetermined corner thereof contains absolute coordinates ZP in the whole map information, e.g., a global map.

The display mesh information VMx is, for instance, constituted from name information VMxA such as intersection names, road information VMxB and background information VMxC. The name information VMxA is data structured in a table for arranging and displaying miscellaneous element data (e.g. intersection name, town name) contained in an area at a predetermined position with reference to a positional relationship based on the absolute coordinates ZP. The road information VMxB is data structured in a table for arranging and displaying road element data (e.g. road) contained in an area at a predetermined position with reference to a positional relationship based on the absolute coordinates ZP. The background information VMxC is data structured in a table for arranging and displaying miscellaneous element data (e.g. mark and image information representing famous spots and buildings) at a predetermined position with reference to a positional relationship based on the absolute coordinates ZP.

The matching data MM, just like the display data VM, is divided into plural pieces of matching mesh information MMx, each having a unique number and relating to an area. The matching data MM is constituted from the plural pieces of matching mesh information MMx continuously arranged in a matrix form. Each matching mesh information MMx has a rectangular shape with each side thereof having a predetermined length, which is reduced relative to the actual geographic length according to the map scale. A predetermined corner thereof contains absolute coordinates ZP in the whole map information, e.g., a global map.

The matching data MM is used for map matching processing for correcting the displayed information to locate a mark representing the vehicle on a road, when the travel progress of the vehicle is superposed on the map information. This processing prevents such errors in which the mark representing the vehicle is displayed on a building instead of the road. The matching data MM has plural pieces of link string block information.

As shown in FIG. 3, the link string block information is data structured in a table so that a plurality of links L are mutually associated according to a predetermined rule. The link L as segment information represents a road and connects nodes N as the point information representing points. Specifically, the links L each corresponding to a predetermined length of a road are mutually connected to form polygonal lines (i.e. link strings), which represent continuous roads such as Koshu street and Ome street. Each link L has segment-specific information (hereafter referred to as a link ID) as a unique number assigned to each link L, and node information as a unique number indicating two nodes N connected by the link L. Each link L is associated with a VICS link to match the positional relationship between the VICS data and the displayed map.

Each node N represents a joint point such as an intersection, a corner, a fork, a junction or the like of each road. Information about the node N has point-specific information as a unique number assigned to each node N in the link string block information, coordinate information of the position where each node N is located, and flag information as branching information describing whether or not the node N represents a branching position (e.g. intersection, fork) where a plurality of links are crossed. Some nodes N only have the point-specific information and the coordinate information without the flag information for simply representing the shape of a road, and some nodes N additionally have attribute information representing the road structure such as width of a tunnel or a road. The nodes N without the flag information for simply representing the road shapes are not used when a coordinate matching section 193B (which will be described later) identifies a point.

Further, the link string block information of the matching data MM is associated with information about the road structure that describes, for example, the number of lanes, whether it is a main line or not, whether it is a national road or a state road, a road type such as a toll road, a tunnel structure and the like. Based on the information about the road structure, roads can be displayed on a map corresponding to the display data VM.

The route-search map information is structured in a table, which is similar to that of the matching data MM, including point information for representing points such as the nodes N for representing roads, and segment information for connecting points such as the links L. The information is so structured to represent roads for searching for a travel route.

The traffic condition prediction table 10, which includes statistical traffic information obtained by statistically processing the past traffic conditions based on time factors, is a data group for showing traffic conditions in the past at an arbitrary spot. The traffic condition prediction table 10 is used to predict a traffic-jam condition at route search processing and at processing for displaying a map or to predict vacancy of a parking lot as an accommodating facility. The traffic condition prediction table 10, as shown in FIG. 4, is structured in a table storing a plurality of records, each single record containing a date-classification ID (identification) 11, time-series data 12$i$ (i representing a natural number) and the like.

The date-classification ID 11 is typically an ID number representing a classification of date and day of the week. In the following description, classification of date and day of the week will be referred to as date classification. For example, "ID1" may indicate any "workday" such as Monday to Friday excluding legal holidays; "ID2" may indicate "Saturday" excluding legal holidays; "ID4" may indicate "special day 1" such as a festival day of City A; "ID5" may indicate "special day 2" such as a day when a sports meeting is held at Athletic Ground B; "ID7" may indicate "the day before a long holiday" such as the day before four consecutive holidays; and "ID 11" may indicate "the day before the end of a long holiday" such as the third day of four consecutive holidays. The date-classification ID 11 is not limited to the ID number, but may be text data directly related to a day such as "workday".

The time-series data 12$i$ is data on the tendency of the traffic-jam condition of the traffic conditions. For example, VICS data may be acquired from the VICS and stored for each VICS link, and then statistically processed for, for instance, every 10 minutes based on the time factor of the stored VICS link (i.e. date classification) so as to be used as the time-series data 12$i$. In other words, the time-series data 12$i$ is data representing a traffic-jam condition at a desired spot (which might be each VICS link) for every predetermined time, such as a length of the traffic jam, a traffic-jam condition representing a traffic-jam level, a time required for passing through the traffic jam, vacancy of a parking lot.

While the time-series data 12*i* described above is data generated by statistically processing the data for each spot based on the time factor, it may alternatively be generated for each facility, shop, area, city and town, road or parking lot.

The storage unit 160 typically stores retrieval information for acquiring information of a predetermined point in the map information. More specifically, the retrieval information includes various information about content and guidance such as names of states, cities and towns, regions and points, which are units used to gradually divide the map information into smaller areas, as well as various information about shops as points. The retrieval information is structured in a tree structure table so that plural pieces of item information are hierarchically associated with each other.

In addition, the storage unit 160 stores parking information table 20 storing various information about a parking lot. The parking information table 20 is, as shown in FIG. 5, structured in a list that contains plural pieces of parking information 21. The parking information 21 is a single data structure in which a parking ID 22, parking name information 23, location information 24, detailed-parking-service information 25 and the like are mutually associated.

The parking ID 22 is information for identifying each parking lot. The parking ID 22 is individually assigned to each parking lot. Based on the parking ID 22, it is determined to which parking vacancy information about the vacancy received by the VICS receiver 120 is related.

The parking name information 23 is information related to a name of a parking lot. The parking name information 23 is referred to when, for instance, the name of the parking lot is displayed on the terminal display section 140.

The location information 24 is information related to a location of a parking lot. The location information 24 contains, for instance, coordinate information of a location of a parking lot in the map information. When the location of the parking lot is displayed on the terminal display section, an indication of the parking lot is superimposed on the map information based on the location information 24. Note that, although an example in which the location information 24 contains the coordinate information in the map information is shown above, the arrangement is not limited thereto. The location information 24 may alternatively contain an address of a parking lot, or a latitude and a longitude thereof.

The detailed-parking-service information 25 is information about detailed content of a service provided by a parking lot. The detailed-parking-service information 25 contains service information and additional service information that is additionally provided when the vehicle is parked in the parking lot. The service information contains information about services provided by the parking lot such as the number of parking spaces and parking fee of the parking lot, and whether or not the parking lot provides a reservation service. The additional service information is about services provided to users who park their vehicles in the parking lot such as "courtesy ticket discount of event site", "coupon ticket between stations A and B" and "discount ticket for shop D", and about reservation of the parking lot The storage unit 160 stores a public transportation information table 30 containing various information about public transportations. The public transportation information table 30 is structured in, as shown in FIG. 6, a table that contains plural pieces of public transportation information 31. The public transportation information 31 is a single data structure in which public transportation name information 32, timetable information 33, boarding/alighting zone information 34 and the like are mutually associated.

The public transportation name information 32 is information related to a name of a public transportation. The public transportation name information 32 contains, for instance, a company name or a line name such as "Railway ○○, Line ΔΔ" of each public transportation. Note that the public transportation may include subways, busses, ships, airplanes and the like in addition to the railways.

The timetable information 33 is information related to a departure timetable of a public transportation. The timetable information 33 may contain a departure timetable for each boarding/alighting zone as a boarding/alighting spot of the public transportation, or may contain an arrival time at each boarding/alighting zone for each public vehicle.

The boarding/alighting zone information 34 is information about a boarding/alighting zone of a public transportation such as stations of railways and subways and bus stops. The boarding/alighting zone information 34 contains, for instance, coordinate information of a location of a boarding/alighting zone in the map information. When the location of the boarding/alighting zone such as a railway station is displayed on the terminal display section, an indication of the boarding/alighting zone is superimposed on the map information based on the boarding/alighting zone information 34. Note that, although an example in which the boarding/alighting zone information 34 contains the coordinate information in the map information is shown above, the arrangement is not limited thereto. The boarding/alighting zone information 34 may contain an address of a boarding/alighting zone, or a latitude and a longitude thereof.

The boarding/alighting zone information 34 also contains whether or not the boarding/alighting zone is transitable to another public transportation. For instance, when a transit from Line B to Line C can be made at Station A, the boarding/alighting zone information 34 of Station A contains information indicating that Station A is a transitable station between Line B and Line C. The boarding/alighting zone information 34 further contains information about travel cost required for traveling between boarding/alighting zones, i.e., transportation fee.

Figure 7:
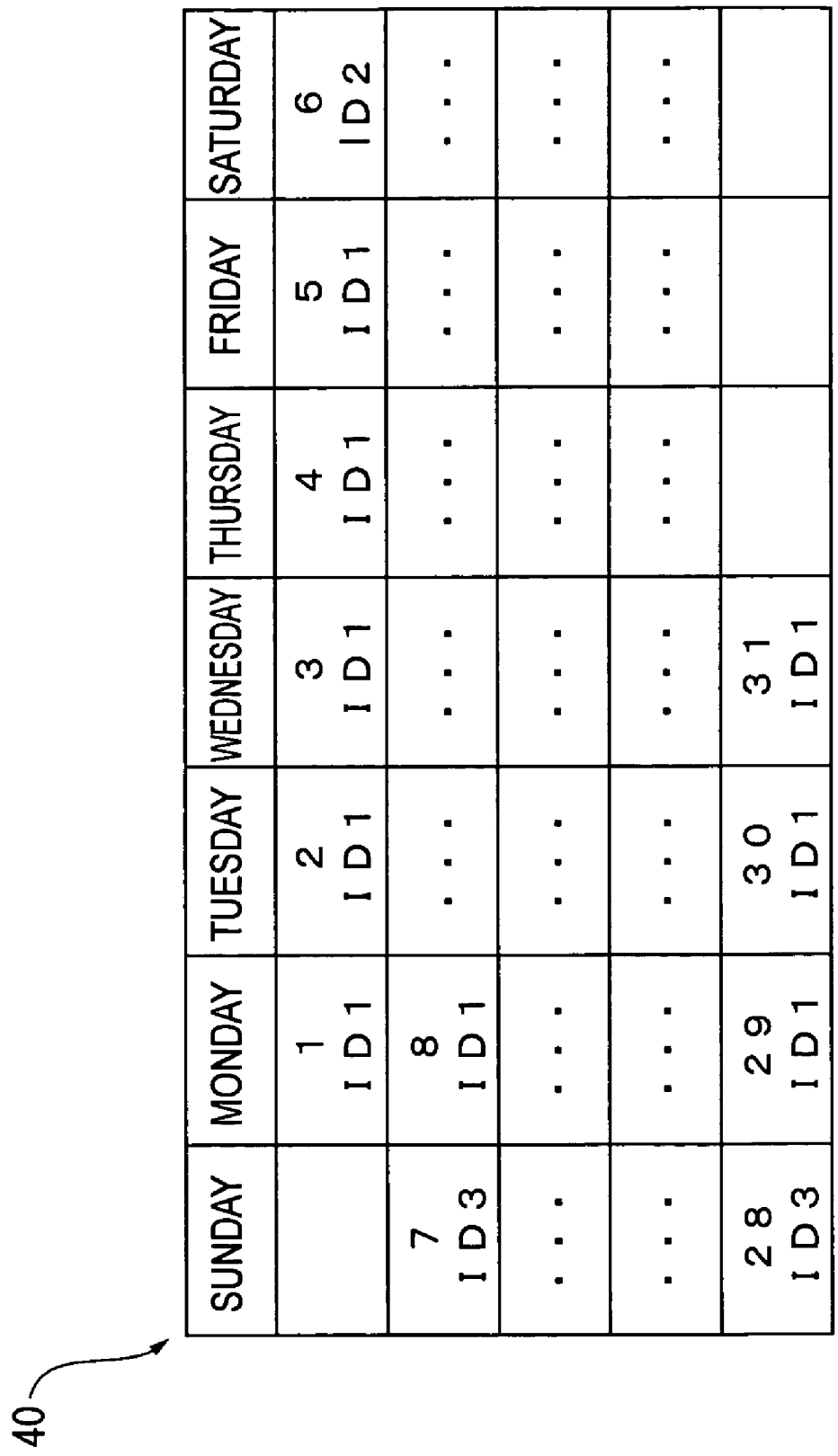
FIG. 7 is a conceptual diagram schematically showing a table structure of data in a calendar template according to the first embodiment.

The memory 170 readably stores the settings that are input by the terminal input section 130, music data and image data as well as a plurality of calendar templates 40 as shown in FIG. 7. The memory 170 also stores various programs that run on the OS (Operating System) controlling the whole operation of the navigation device 100. The memory 170 may preferably be a CMOS (Complementary Metal-Oxide Semiconductor) memory that retains the stored data even in the case of, for instance, a sudden power interruption caused by a blackout. The memory 170 may include drives or drivers for readably storing data on recording media such as a HD, a DVD, and an optical disc.

The calendar template 40 is a template representing a date classification of each date. More specifically, the calendar template 40 is structured in a table structure storing plural pieces of table data for every month, typically twelve pieces of table data. Each table data has a plurality of records, each containing date information about date, classification ID numbers associated with respective dates of the date information.

The classification ID number is identical to one of the date-classification IDs 11 in the traffic condition prediction table 10 and indicates the date classification of the date specified by the date information. For example, Friday 5th is classified as "workday" associated with "ID1", and Monday 15th is classified as "legal holiday" associated with "ID3". The classification ID number of the calendar template 40 can be changed by the processor 190 if necessary. The classification ID number is not limited to numerical values, but may alternatively be a text data (e.g. "workday") corresponding to the date-classification ID in the traffic condition prediction table 10.

The transmitting/receiving section 180 transmits and receives various information via a network. The transmitting/receiving section 180 communicates via a network with a service server device (not shown) provided at a parking lot. Specifically, the transmitting/receiving section 180 recognizes the additional service information of the detailed-parking-service information 25 of the parking information 21 and transmits to the service server device information for applying for various additional services provided by the parking lot via the network. The transmitting/receiving section 180 receives from the service server device service application completing information indicating that the application of the additional service has been completed.

Figure 8:
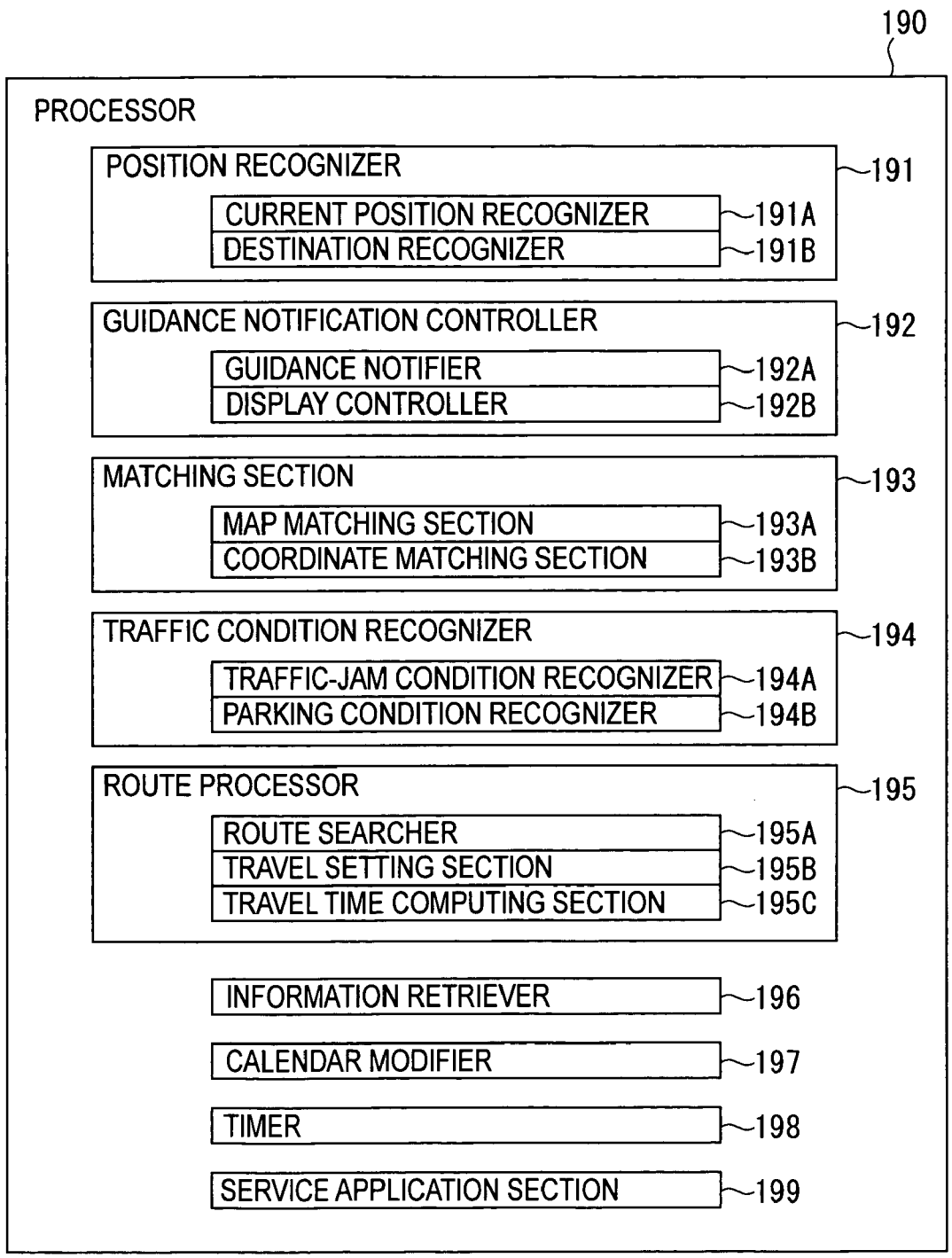
FIG. 8 is a block diagram schematically showing an arrangement of a processor of the navigation device according to the first embodiment.

The processor 190 has various input/output ports (not shown) including a VICS receiving port connected to a VICS antenna, a GPS receiving port connected to a GPS receiver, sensor ports respectively connected to various sensors, a key input port connected to the terminal input section 130, a display control port connected to the terminal display section 140, a sound control port connected to the sound output section 150, a storage port connected to the storage unit 160, a memory port connected to the memory 170 and a transmitting/receiving port connected to the transmitting/receiving section 180. The processor 190 includes, as shown in FIG. 8, various programs such as: a position recognizer 191; a guidance notification controller 192 also functioning as a notification controller, a service information acquirer, an additional service information acquirer and a transportation fee information acquirer; a matching section 193; a traffic condition recognizer 194; a route processor 195; an information retriever 196 also functioning as a facility information acquirer and a public transportation information acquirer; a calendar modifier 197, a timer 198, a service application section 199 and so on.

The position recognizer 191 recognizes position information about positions of the vehicle and the destination based on the map information. The position recognizer 191 includes a current position recognizer 191A, a destination recognizer 191B and the like.

The current position recognizer 191A recognizes the current position of the vehicle. More specifically, the current position recognizer 191A calculates a plurality of current simulated positions of the vehicle on the basis of the speed data and the azimuth data of the vehicle output respectively from the speed sensor and the azimuth sensor of the sensor 110. The current position recognizer 191A further recognizes the current simulated coordinate values of the vehicle based on the GPS data on the current position output from the GPS receiver. Then, the current position recognizer 191A compares the calculated current simulated positions with the recognized current simulated coordinate values, and calculates the current position of the vehicle on the map information separately acquired so as to recognize the current position.

The current position recognizer 191A determines a slope angle and an altitude of a road to drive based on the acceleration data output from the acceleration sensor and calculates the current simulated position of the vehicle so as to recognize the current position. Thus, the current position of the vehicle can be accurately recognized even if the vehicle is on an intersection with an overpass or on an elevated highway where roads are overlaid in a two-dimensional view. Furthermore, when the vehicle runs on a mountain road or a slope, the current position recognizer 191A corrects the discrepancy between the travel distance obtained based only on the speed data and the azimuth data and the actual travel distance by using the detected slope angle of the road to accurately recognize the current position.

The current position recognizer 191A can recognize not only the current position of the vehicle as described above but also a departing point, i.e. an initial point set by the terminal input section 130 as the current simulated position. Various information acquired by the current position recognizer 191A is appropriately stored in the memory 170.

The destination recognizer 191B typically acquires the destination information about the destination set by the input operation at the terminal input section 130 and recognizes the position of the destination. The destination information to be set includes various information for specifying a spot, which might be coordinates such as latitude and longitude, addresses, telephone numbers and the like. Such destination information recognized by the destination recognizer 191B is appropriately stored in the memory 170.

The guidance notification controller 192 reads the various information stored in the memory 170 and controls the terminal display section 140 and the sound output section 150 to provide guidance. The various information stored in the memory 170 may include, for instance, the current position information, the destination information, the parking information 21 and the public transportation information 31 that are processed by the processor 190 and stored in the memory 170. The guidance notification controller 192 includes a guidance notifier 192A, a display controller 192B as a map information acquirer, and the like.

The guidance notifier 192A notifies guidance stored in the memory 170 by an image display using the terminal display section 140 or by sound using the sound output section 150 based on travel route information and feature guidance information acquired in advance according to the driving status. The guidance is related to the travel of the vehicle, which may be the content for assisting the drive of the vehicle. Specifically, for instance, a certain arrow or symbol may be displayed in a display screen of the terminal display section 140, or guidance such as "Turn right in 700 meters at intersection ○○ toward ΔΔ", "You have deviated from the travel route." and "Traffic-jam ahead" is output by sound from the sound output section 150.

The display controller 192B appropriately controls the terminal display section 140 to display the various information thereon. The display controller 192B also controls display of various display screens for prompting the user to operate the terminal input section 130 so as to set various information.

The matching section 193 controls the map information and performs matching processing for superimposing the current position and other points on the map information. The matching section 193 includes a map matching section 193A, the coordinate matching section 193B and the like.

The map matching section 193A performs the map matching processing for displaying the current position recognized by the current position recognizer 191A based on the map information obtained from the storage unit 160. As described earlier, the map matching section 193A typically uses the matching data MM for performing the map matching processing to modify or correct the current position information to prevent the current position superimposed on the map on the terminal display section 140 from being located off the road in the map on the terminal display section 140.

The coordinate matching section 193B performs the coordinate matching processing for determining whether or not point information about nodes N contained in the matching data MM of the map information acquired from the storage unit 160 indicate an identical point. In other words, as described earlier, the coordinate matching section 193B acquires point information of nodes N contained in the matching data MM and reads the coordinate information of the point information. More specifically, the coordinate matching section 193B calculates the coordinate values such as the latitude and the longitude based on the coordinate values of the coordinate information and the offset amount. If different nodes N have identical coordinate values, it reads the flag information of the point information of the nodes N to determine whether the nodes N represent the identical point. When determining that the nodes N are identical, the coordinate matching section 193B recognizes a road arrangement in which the links L respectively connected to the nodes N and contained in the different link string block information are crossed with each other, and thus considers as, for example, an intersection. When, on the other hand, determining that the nodes N are not identical, the coordinate matching section 193B recognizes a road arrangement in which the links L respectively connected to the nodes N and contained in the different link string block information are not crossed with each other, and thus considers as, for example, a multi-level intersection.

The traffic condition recognizer 194 recognizes the traffic condition based on various VICS data output from the VICS receiver and various data acquired from the traffic condition prediction table 10 and the parking information table 20. The traffic condition recognizer 194 includes a traffic-jam condition recognizer 194A also functioning as a traffic information recognizer, a statistical traffic information acquirer and a traffic-jam-condition change recognizer and a parking condition recognizer 194B as a facility accommodation condition recognizer.

The traffic-jam condition recognizer 194A generates current traffic-jam information about traffic jams that are currently present. More specifically, the traffic-jam condition recognizer 194A appropriately acquires VICS data from VICS output from the VICS receiver 120. Then, based on the acquired VICS data, the traffic-jam condition recognizer 194A generates current traffic-jam information about the traffic jams that are currently present in an area including, for example, the current position and the destination or in a predetermined area around the current position.

Additionally, the traffic-jam condition recognizer 194A obtains an estimated arrival time as an estimated time to arrive at an arbitrary spot on the route to the destination. For instance, the traffic-jam condition recognizer 194A obtains an estimated arrival time as an estimated time to arrive at an arbitrary spot on the route to the destination. Then, based on the obtained estimated arrival time, a preset scheduled time, the time-series data 12$i$, etc., the traffic-jam condition recognizer 194A generates traffic-jam prediction information about predictions of the traffic jam that may arise at the arbitrary spot before arriving at the destination or at the preset scheduled time.

More specifically, the traffic-jam condition recognizer 194A recognizes the classification ID number of the date for which prediction of traffic-jam condition will be performed on the basis of the time information acquired from the timer 198 and the calendar template 40. Then, the traffic-jam condition recognizer 194A retrieves and acquires the time-series data 12$i$ for the area corresponding to the recognized classification ID number and including the current position and the destination from the traffic condition prediction table 10. After that, based on the current traffic-jam information and a current time acquired from the timer 198, the traffic-jam condition recognizer 194A calculates an estimated arrival time to arrive at a desired spot on a candidate travel route specified by candidate travel route information (which will be described later) generated by a route processor 195.

The estimated arrival time may be calculated with, for instance, a method below. Firstly, the distance to a desired spot on the candidate travel route is recognized based on the candidate travel route information, and the time required to travel the recognized distance is calculated based on the current traffic-jam information. Subsequently, the estimated arrival time is calculated on the basis of the calculated required time and the current time. Then, the traffic-jam prediction information is generated based on the time-series data 12$i$ and the estimated arrival time.

The parking condition recognizer 194B generates current parking condition information about the current vacancy of the parking lot. Specifically, the parking condition recognizer 194 appropriately acquires VICS data from VICS output from the VICS receiver 120, and based on, for instance, information about vacancy of a parking lot contained in the acquired VICS data, and generates the current parking condition information about the current vacancy of the parking lot.

The parking condition recognizer 194B generates parking vacancy prediction information about predicted vacancy of a parking lot around the destination. For instance, the parking condition recognizer 194B calculates an estimated arrival time to arrive at a desired parking lot. Then, the parking condition recognizer 194B predicts the vacancy of the parking lot based on the estimated arrival time at the parking lot, a preset scheduled time and change over time of the vacancy of the parking lot contained in the time-series data 12$i$ in order to generate the parking vacancy prediction information.

More specifically, the parking condition recognizer 194B recognizes the classification ID number of the date for which prediction of traffic-jam condition will be performed on the basis of the time information acquired from the timer 198 and the calendar template 40. Then, the parking condition recognizer 194B retrieves and acquires the time-series data 12$i$ for the area corresponding to the recognized classification ID number and including the current position and the destination from the traffic condition prediction table 10. After that, based on the current parking condition information and current time acquired from the timer 198, the parking condition recognizer 194B calculates an estimated arrival time to arrive at a desired spot on a candidate travel route specified by candidate travel route information (which will be described later) generated by the route processor 195. Then, the parking vacancy prediction information is generated based on the time-series data 12$i$ and the estimated arrival time.

The route processor 195 performs processing about settings of the travel route to the destination or to a predetermined point. The route processor 195 includes a route searcher 195A as a route setting section, a travel setting section 195B, a travel time computing section 195C also functioning as a travel distance computing section and a time computing section, and the like.

The route searcher 195A searches for a travel route by computing the driving route of the vehicle based on the setting information that is set by the user for setting the route as well as the map information stored in the storage unit 160. The route searcher 195A can compute the travel route by taking into account the current traffic-jam information and the traffic-jam prediction information generated by the traffic jam condition recognizer 194A when the processor 190 recognizes traffic jam prediction request information requesting a travel route search that takes into account the current traffic jam information and the traffic jam prediction information.

More specifically, if the setting information does not contain the traffic-jam prediction request information, the route processor 195 acquires the current position, the destination, the setting information and the current traffic-jam information. Then, based on the acquired information, the route processor 195 searches for available roads, where for example traffic is allowed, using the route-search map information of the map information, and generates travel route information for setting a route with a shorter required time, a route with a shorter distance, a route without traffic jams and traffic controls and the like.

If, on the other hand, the setting information contains the traffic-jam prediction request information, the route processor 195 acquires the current position, the destination, the setting information and the current traffic-jam information. Then, based on the acquired information, the route processor 195 generates candidate travel route information for setting candidate routes such as a route with shorter travel time, a route with shorter travel distance and a route without traffic jams and traffic controls. The route processor 195 then acquires the current traffic-jam information and the traffic-jam prediction information and reduces the number of the candidate routes contained in the candidate travel route information based on the acquired information, thereby generating travel route information for setting a route etc.

In the travel route search, the route processor 195 might use the matching data MM of the map information in addition to the route-search map information. This applies to, for instance, a case where the route processor 195 searches for the travel route including a narrow road such as a back street which is not contained in the route-search map information. When the matching data MM is used, the route is appropriately searched for according to the road arrangement recognized by the coordinate matching section 193B. The travel route information typically includes route guidance information for navigating the vehicle during the drive thereof for assisting the drive. Under the control of the guidance notifier 192A, the route guidance information may be appropriately displayed on the terminal display section 140 or output as sounds from the sound output section 150 to assist the drive.

The route searcher 195A takes into account the traffic-jam prediction information to compute an estimated arrival position of the vehicle at every predetermine time period (e.g. 30 minutes) required for the vehicle to travel on the travel route, using information from the sensor 110 and the map information. Specifically, the route searcher 195A computes a travel distance during the predetermined time period from information about legal speed included in the map information, and recognizes the estimated arrival position based on the computed travel distance and using the matching data MM of the map information. The estimated position information about the estimated arrival position is appropriately stored in the memory 170.

The travel setting section 195B sets a travel means from the parking lot to the destination For instance, when the parking lot is located near the destination, a travel means from the parking lot to the destination is set to walk, which is readably stored as travel means information in the memory 170. When there is a bicycle rental or a taxi terminal near the parking lot, a bicycle rental or a taxi as travel means from the parking lot to the destination are additionally stored in the memory as travel means information.

When there is a public transportation having a boarding/alighting zone near the destination and another boarding/alighting zone near the parking lot, a travel means from the parking lot to the another boarding/alighting zone near the parking lot is set. In this case also, when there is a travel means such as a bicycle rental in addition to the walk, such travel means is stored in the memory 170 as travel means information. Likewise, a travel means from the boarding/alighting zone near the destination to the destination is set and stored as travel means information.

The travel time computing section 195C computes a travel distance of the travel route set by the route searcher 195A based on the map information. The travel time computing section 195C computes a travel time required for traveling on the travel route based on the travel distance. At this time, the travel time computing section 195C recognizes the travel means set by the travel setting section 195B to compute a travel time for each travel means. Specifically, when "vehicle" and "walk" are stored as the travel means, travel times that are required for traveling by the travel means of "vehicle" and "walk" are computed. Note that a travel speed for the travel means is preset. For example, the travel speed may be set as follows: 60 kilometers per hour for "vehicle"; 90 kilometers per hour for "vehicle" traveling on a highway; 3 kilometers per hour for "walk", based on which the travel time is computed.

The travel time computing section 195C computes an estimated parking arrival time to arrive at the parking lot and an estimated destination arrival time to arrive at the destination based on the computed travel time and the current time recognized by the timer 198. The travel time computing section 195C readably stores in the memory 170 travel distance information about the travel distance, travel time information about the travel time, estimated parking arrival time information and estimated destination arrival time information.

The information retriever 196 hierarchically retrieves and acquires the parking information or the retrieval information such as shops and facilities stored in the storage unit 160 on the basis of the item information in response to, for example, a retrieval request for the retrieval information set at the terminal input section 130.

When a request for retrieving a parking lot is set by the user operating the terminal input section 130 upon recognizing the destination information with the destination recognizer 191B, the information retriever 196 retrieves a parking lot near the destination. Specifically, the information retriever 196 acquires the destination information about the destination and recognizes position information of the destination. Then, the information retriever 196 reads the parking information table 20 and acquires parking information 21 that contains location information 24 indicating a location within a predetermined distance from the destination in order to generate parking candidate information. The parking candidate information contains the travel means information acquired by the travel setting section 195B, the travel distance information computed by the travel time computing section 195C, the travel time information, the estimated parking arrival time information and the estimated destination arrival time information and the like in addition to the parking information 21.

The information retriever 196 retrieves a position of the destination, a location of a parking lot near the destination and a position of a boarding/alighting zone such as a station of a train that is available near the destination based on the destination information, the parking information table 20 and the public transportation information 31. The information retriever 196 then retrieves another boarding/alighting zone on a line of the public transportation and another transitable public transportation based on the boarding/alighting zone information 34 of the public transportation information 31. Then, the information retriever 196 retrieves a parking lot near the boarding/alighting zones of these public transportations. The information retriever 196 acquires parking information 21 and generates parking candidate information for the retrieved parking lot as described above, the parking candidate information readably stored in the memory 170.

The calendar modifier 197 appropriately updates the calendar template 40 stored in the memory 170 on the basis of modifications set by the user. More specifically, the calendar modifier 197 recognizes various information set by the input operations of the user at the terminal input section 130. This information may include date information for specifying date and event information about events such as festivals and sports meeting. Then, the calendar modifier 197 recognizes the date specified by the date information, and also recognizes the classification ID number associated with the event information. The classification ID number may be typically recognized as follows. The date classification is determined based on the set event information, and the classification ID number is recognized based on the determined date classification. If, for example, the event information relates to a sports meeting to be held at Athletic Ground B, the date classification is determined as "special day 2", and the classification ID number is recognized as "ID5" based on the "special day 2". If the event information relates to the last day of five consecutive holidays, the date classification is recognized as "the last day of a long holiday" and the classification ID number as "ID 10" based on the "last day of a long holiday". Then, the calendar modifier 197 appropriately modifies the calendar template 40 on the basis of the recognized date and the classification ID number.

The timer 198 recognizes the current time typically based on a reference pulse of an internal clock. Then, the timer 198 appropriately outputs time information about the recognized current time.

The service application section 199 performs processing for applying for an additional service or the like. Specifically, the service application section 199 acquires additional service information of detailed-parking-service information 25 of the parking information 21. Next, the service application section 199 generates information for prompting the user to select whether to receive the additional service information contained in the detailed-parking-service information 25, which is displayed on the terminal display section 140 to be notified to the user. Then, when information for applying for the additional service is input by the user's input operation, the service application section 199 generates service application information and transmits from the transmitting/receiving section 180 to, for instance, a service server unit managing the parking lot. Then, upon receiving information indicating that service application is completed from the service application section, the service application section 199 displays the information on the terminal display section 140 to notify the completion of the service application.

[Operation of Navigation Device]

Now, the operation of the navigation device 100 will be described with reference to the drawings.

(Route Search Processing)

Now, the route search processing as one of the operations of the navigation device 100 will be described with reference to FIGS. 9 to 12.

Figure 9:
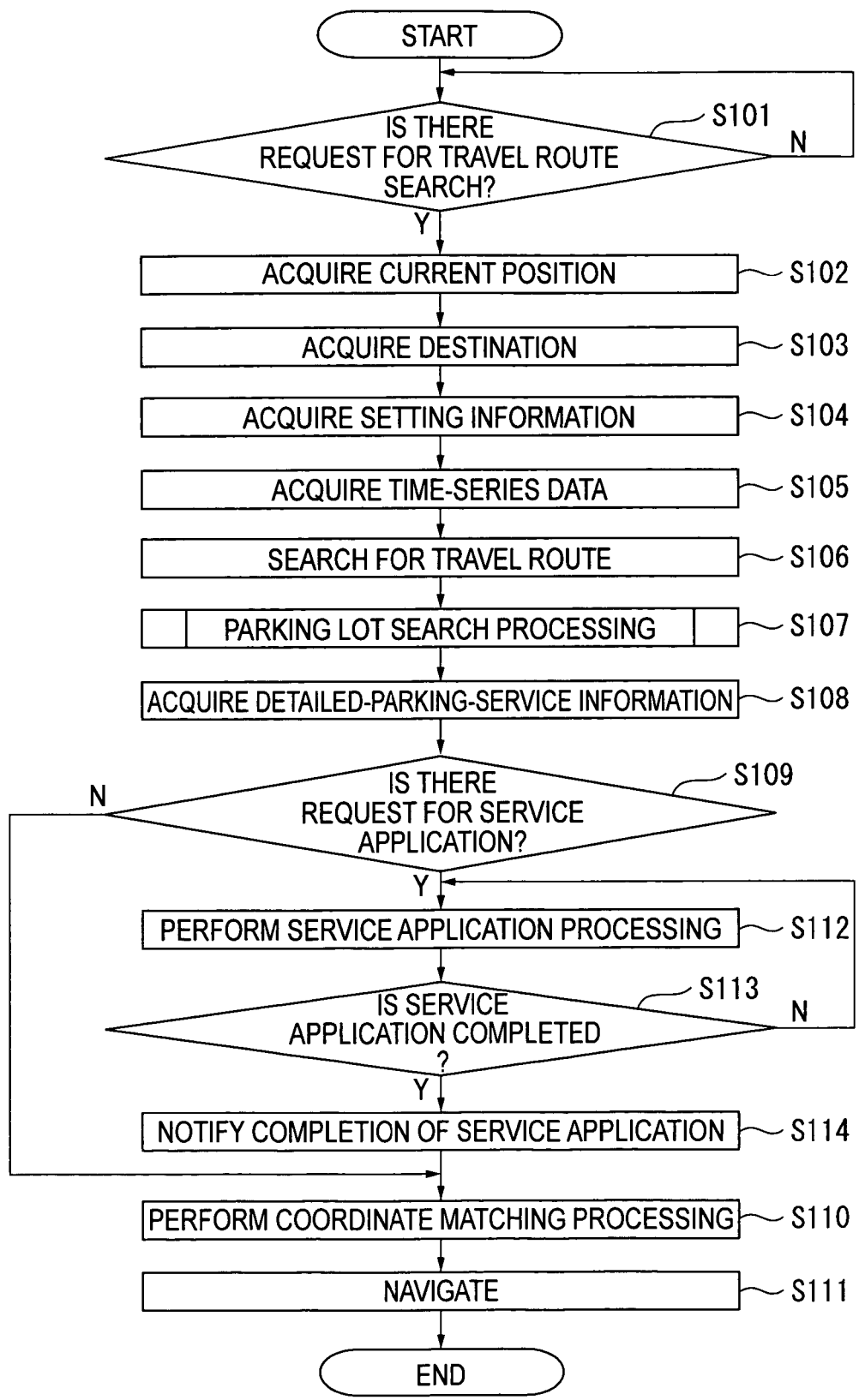
FIG. 9 is a flowchart showing route search processing in the navigation device according to the first embodiment.

Firstly as shown in FIG. 9, the user operates the terminal input section 130 to set a command for route search processing. When the processor 190 recognizes the set command for the route search processing (Step S101), the processor 190 displays a screen on the terminal display section 140 for prompting the user to set various information necessary for travel route search such as the destination, the setting information about the preference for shortest travel distance or shortest travel time and the necessity of traffic-jam prediction.

When the processor 190 recognizes the various information necessary for the travel route search, the current position recognizer 191A recognizes the current position (Step S102) and the destination recognizer 191B recognizes the set destination (Step S103). Specifically, the current position recognizer 191A calculates the current position of the vehicle based on the speed data and the azimuth data of the vehicle respectively output from the speed sensor and the azimuth sensor of the sensor 110 and the GPS data about the current position output from the GPS receiver, and acquires the current position information. The acquired current position information is appropriately stored in the memory 170.

The processor 190 controls the terminal display section 140 to display a screen for prompting the user to set the destination with the input operation at the terminal input section 130. Then, when the user sets the destination by operating the terminal input section 130 following the instructions on the display screen, the destination recognizer 191B acquires the destination information about the set destination. The acquired destination information is appropriately stored in the memory 170.

If the user requests to acquire point information about a point of the destination in the step of inputting the destination by operating the terminal input section 130, the user operates the terminal input section 130 so as to request the retrieval information of the point following the instructions on the screen displayed on the terminal display section 140. In response to the retrieval request for the retrieval information of the point, the processor 190 operates the information retriever 196 to hierarchically retrieve the retrieval information about the destination from the mesh information at the lower layers for each area, typically using the map information MP and acquire the retrieval information associated with the point of the destination from the storage unit 160. Then, the processor 190 controls the terminal display section 140 to display the acquired retrieval information.

If the retrieval information requires to display map information of a predetermined area containing the destination or if the user who has recognized the retrieval information operates the terminal input section 130 to display a predetermined area, the processor 190 appropriately controls the terminal display section 140 to display the display mesh information VMx for the corresponding area. After the desired map information is displayed on the terminal display section 140 in this way, the user specifies the point information of the destination by appropriately setting the point of the destination with the input operation at the terminal input section 130, for example, by moving the cursor displayed on the map on the screen. When the point information is specified in this way, the destination recognizer 191B of the processor 190 recognizes the point information of the destination as the destination information and stores it in the memory 170.

The processor 190 controls the terminal display section 140 to display a screen for prompting the user to input the settings, i.e., criteria for the travel route search. When the user inputs the settings by operating the terminal input section 130 following the instruction on the display screen, the processor 190 acquires the setting information about the settings that have been input (Step S104). The acquired setting information is appropriately stored in the memory 170.

Thereafter, the processor 190 acquires time information from the timer 198 to recognize the current date from the acquired time information. Then, The processor 190 acquires the calendar template 40 from the memory 170, and then retrieves and recognizes the classification ID number of the recognized date based on the acquired calendar template 40. The processor 190 also acquires the current position information and the destination information stored in the memory 170 and recognizes the current position and the destination. Then, the traffic-jam condition recognizer 194A retrieves and acquires the time-series data 12i corresponding to the recognized classification ID number and containing the current position and the destination from the traffic condition prediction table 10 stored in the storage unit 160 (Step S105).

Then, the processor 190 generates the current traffic-jam information with the traffic-jam condition recognizer 194A and appropriately stores it in the memory 170. Then, the route processor 195 of the processor 190 acquires the current position information, the destination information and the setting information from the memory 170. Based on the acquired various information, the route processor 190 detects a plurality of travel routes and selects some of the travel routes on the basis of the acquired setting information to generate candidate travel route information about a plurality of candidate travel routes that meet the requirements of the user.

Thereafter, the traffic jam condition recognizer 194A of the processor 190 acquires the current traffic jam information from the memory 170 and the current time and day from the timer 198. Then, based on the acquired current traffic jam information and the current time and day, the traffic jam condition recognizer 194A estimates the estimated arrival time to arrive at an arbitrary spot on the respective candidate travel routes contained in the candidate travel route information generated by the route processor 195. Then, the traffic-jam condition recognizer 194A predicts the traffic jam condition at the arbitrary spot on the respective candidate travel routes at the estimated arrival time on the basis of the time-series data 12i acquired in Step S105 and generates traffic jam prediction information about the predicted traffic jam condition.

The route processor 195 of the processor 190 reduces the number of the candidate travel routes of the candidate travel route information based on the current traffic-jam information and the traffic-jam prediction information to generate travel route information to the destination (Step S106).

Then the processor 190 performs parking lot search processing to acquire the parking information and the travel route information via the parking lot (Step S107). Incidentally, when the parking information is not acquired in Step S107, the processor 190 may display the travel route to the destination on the terminal display section 140 and start navigation of the travel route to the destination.

Next, the processor 190 recognizes the detailed-parking-service information 25 of the parking information 21 acquired in Step S107 and stored in the memory 170 (Step S108). Then, the service information contained in this detailed-parking-service information and the additional service information are displayed on the terminal display section 140 or notified by sound from the sound output section 150.

Then, the processor 190 acquires, from the user's input operation at the terminal input section 130, information whether or not to apply for a service provided by the parking (Step S109). Here, when recognizing information for not applying for the additional service, the processor 190 acquires the matching data MM from the storage unit 160. Then, the coordinate matching section 193B performs coordinate matching processing on the acquired matching data MM (Step S110) to recognize the arrangement of roads, i.e., the connection of roads, which is then stored in the memory 170. Then, under the control of the display controller 192B of the processor 190, the terminal display section 140 superimposes on the acquired map information an icon indicating the current position of the vehicle based on the current position information as well as the travel route information about the travel route selected by the user, the traffic-jam prediction information, the required-time information, the current traffic-jam information and the information about the location of the destination and the location of the parking lot, and the sound output section 150 appropriately outputs sounds for navigation (Step S111).

On the other hand, when acquiring information indicating that the additional service of the parking lot is to be applied for in Step S109, the processor 190 recognizes an additional service to be applied for at the service application section 199 and generates service application information. Specifically, the service application section 199 acquires the parking ID 22 and the additional service information of the detailed-parking-service information 25 from the parking information 21. Upon checking an additional service desired by the user, the service application section 199 generates service application information containing identification information for identifying the navigation device 100, personal information such as a name and a contact of the applicant and the like. Then, the service application section 199 transmits the service application information with the parking ID for identifying the parking lot from the transmitting/receiving section 180 to perform service application processing (Step S112).

Thereafter, when information about completion of the application of the additional service is received by the transmitting/receiving section 180 (Step S113), the processor 190 notifies the completion of the application of the additional service by displaying it on the terminal display section 140 (Step S114). Incidentally, in Step S113, when the information about the completion of the application of the additional service cannot be received or when the user desires to apply for another additional service, the process returns to Step S112 to perform the service application processing.

Thereafter, the processor 190 performs the processing of Steps S110 and S111. Specifically, the processor 190 acquires the matching data MM from the storage unit 160. Then, the coordinate matching section 193B performs the coordinate matching processing on the acquired matching data MM for recognizing the connection of roads, which is stored in the memory 170. Then, under the control of the display controller 192B of the processor 190, the terminal display section 140 superimposes on the acquired map information an icon indicating the current position of the vehicle based on the current position information as well as the travel route information about the travel route selected by the user, the traffic-jam prediction information, the required-time information, the current traffic-jam information and information about locations of the destination and the parking lot, and the sound output section 150 appropriately outputs sounds to perform navigation.

(Parking Lot Selection Processing)

Now, parking lot selection processing will be described below referring to FIGS. 10 to 12.

Figure 10:
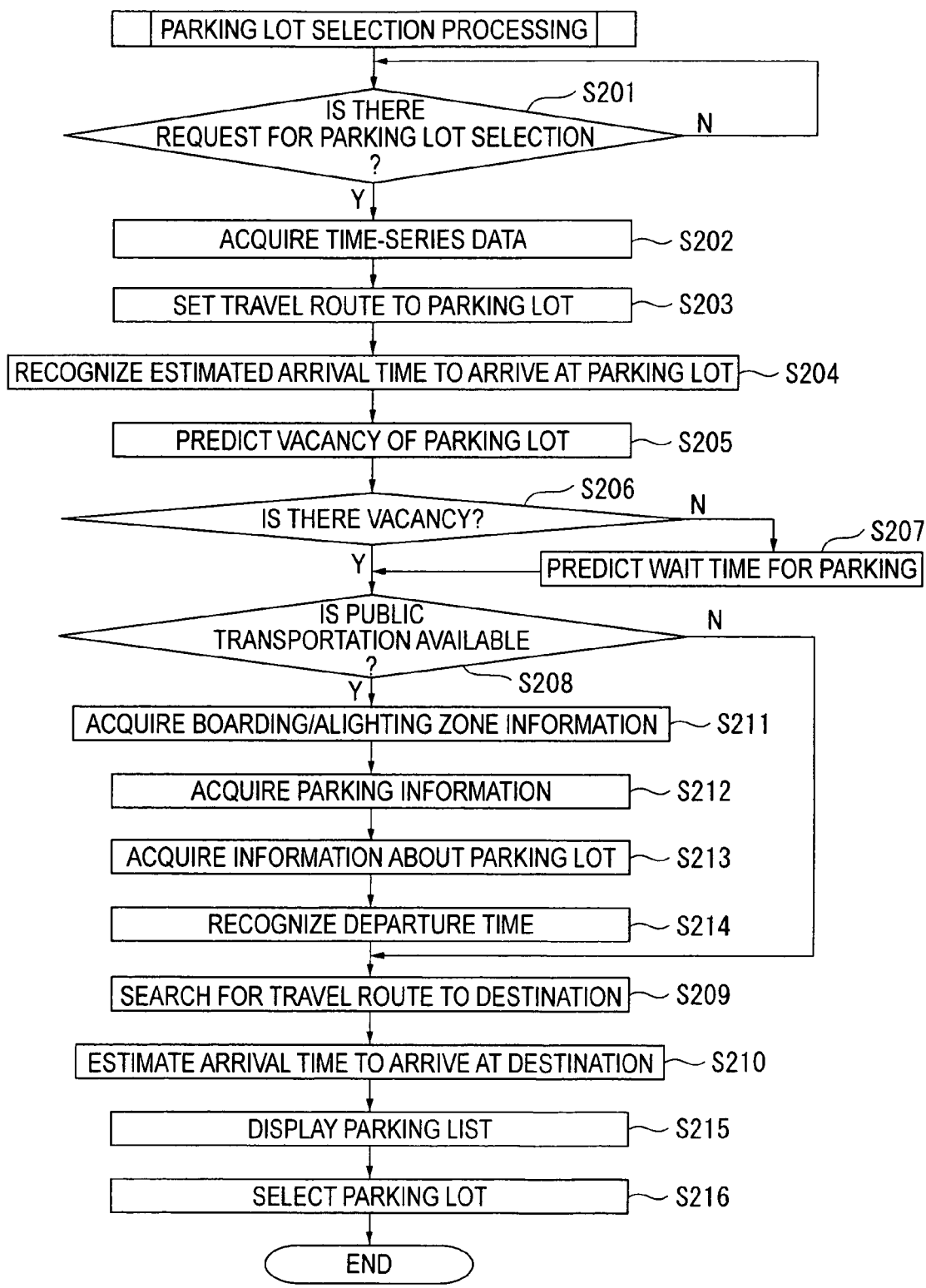
FIG. 10 is a flow chart showing parking lot search processing according to the first embodiment.

First, as shown in FIG. 10, the user operates the terminal input section 130 to set a command for the parking lot selection processing. When the processor 190 recognizes the set command for the parking lot selection processing (Step S201), the processor 190 recognizes the current date from the time information acquired from the timer 198, and retrieves and recognizes the classification ID number of the recognized date from the calendar template 40 acquired from the memory 170. Then, the traffic-jam condition recognizer 194A retrieves and acquires the time-series data 12i corresponding to the recognized classification ID number and containing the current position and the destination from the traffic-jam condition prediction table 10 stored in the storage unit 160 (Step S202).

Next, the information retriever 196 of the processor 190 retrieves parking lots located within a predetermined distance (e.g., 1 kilometer radius) from the destination to acquire parking information thereof. Specifically, the information retriever 196 retrieves location information of a location within the predetermined distance (e.g., 1 kilometer radius) from a position contained in the destination information and acquires parking information 21 of the retrieved location information 24 based on the parking information table 20 stored in the storage unit 160. The retrieved and acquired parking information 21 is structured in, for instance, a list, which is readably stored in the memory 170 as parking candidate information.

Thereafter, the processor 190 operates the route searcher 195A of the route processor 195 to search for first travel routes from the current position of the vehicle to the retrieved parking lots and obtain candidate travel route information to the parking lots (Step S203). The processor 190 operates the travel time computing section 195C of the route processor 195 to compute travel distances to the travel routes shown by the candidate travel route information to the parking lots based on the map information. Further, the travel time computing section 195C computes travel times of the first travel routes based on information about the travel speed of the vehicle recognized by the sensor 110, the current traffic-jam information and the traffic-jam prediction information to acquire estimated parking arrival information about estimated arrival times to arrive at the parking lots (Step S204). Then, the processor 190 associates the candidate travel route information to the parking lot, the travel distance information about the travel distance and the estimated parking arrival time information, each acquired by computation, with the parking information, which is added to candidate parking information.

The processor 190 operates the parking condition recognizer 194B of the traffic condition recognizer 194 to predict vacancy of the parking lots at a predetermined time (Step S205). Specifically, the parking condition recognizer 194B recognizes change over time of the vacancy of the parking lots based on the time-series data 12i. Then, the parking condition recognizer 194B predicts the vacancy of the parking lots at the estimated arrival times to arrive at the parking lots, which have been acquired in Step S204, to generate vacancy information. The parking condition recognizer 194B then recognizes the vacancy information generated in Step S205 (Step S206), and when there is predicted to be no parking space as the vacancy in a parking lot, the parking condition recognizer 194B predicts a wait time for a parking space based on the time-series data 12i and acquires wait time information (Step S207). Then, the processor 190 associates the vacancy information and the wait time information with the parking information, which is added to the candidate parking information in the memory 170.

The information retriever 196 of the processor 190 retrieves a boarding/alighting zone of the public transportation near the destination (Step S208). Specifically, the information retriever 196 retrieves a boarding/alighting zone of a public transportation near the destination based on the public transportation information 31.

When there is no boarding/alighting zone of the public transportation near the destination, the route searcher 195A of the processor 190 searches for second travel routes from the parking lots to the destination and acquires candidate travel route information (Step S209). At the same time, the travel setting section 195B of the processor 190 sets travel means to the destination. Specifically, the travel setting section 195B recognizes travel means information about travel means such as "walk", "bicycle" and "taxi", which is set by the user's input operation.

Then, the travel time computing section 195C of the processor 190 computes travel distances from the parking lots to the destination based on the map information to acquire the travel distance information. The travel time computing section 195C computes travel times from the parking lots to the destination based on the travel means information recognized by the travel setting section 195B to generate estimated destination arrival time information about estimated times to arrive at the destination. The travel time computing section 195C computes travel distance information for each of the candidate travel route information to generate estimated destination arrival time information for each of the travel means information (Step S210).

On the other hand, when it is recognized in Step S208 that three is an available boarding/alighting zone of a public transportation such as a railway station and a bus stop near the destination, the processor 190 operates the information retriever 196 to retrieve boarding/alighting zone information 34 about another boarding/alighting zone on a line of the public transportation having the said available boarding/alighting zone or about a boarding/alighting zone located on a line of another public transportation that is transitable from the said public transportation (Step S211). For instance, as shown in FIG. 11, the information retriever 196 retrieves the public transportation near the destination and acquires Station B of Railway C, and further acquires public transportation information 31 of Station A on the line of Railway C. Then, based on the map information, the information retriever 196 retrieves parking information about a parking near the boarding/alighting zone information 34 acquired in Step S211 (Step S212). For instance, in FIG. 11, the information retriever 196 recognizes Parking P-a near Station A and acquires parking information 21 about Parking P-a.

The processor 190 further performs processing of from Step S202 to Step S207 for this parking information. Specifically, the processor 190 acquires the traffic-jam prediction information based on the time-series data 12i, acquires the candidate travel route information to the parking lot, and generates travel distance information and the estimated parking arrival time information about the candidate travel route information. Further, the information retriever 196 generates vacancy information about vacancy of the parking lot and generates wait time information about wait time for the parking lot. Then, the processor 190 associates the candidate travel route information, the travel distance information, the estimated parking arrival time information, the vacancy information and the wait time information with the parking information 21, which is added to the candidate parking information in the memory 170 (Step S213). The processor 190 recognizes timetable information 33 of the public transportation information 31 (Step S214).

Thereafter, the processor 190 performs the processing of Steps S209 and S210. Specifically, the route searcher 195A of the processor 190 acquires candidate travel route information about the second travel routes from the parking lots in the parking information 21 contained in the candidate parking information 21 to the destination. Then, the travel time computing section 195C of the processor 190 computes travel distance information about travel distances based on the candidate travel route information. The travel setting section 195B of the processor 190 retrieves travel means from the parking lots to the destination, such as "walk", "bicycle", "bus" and "railway" and generates travel means information about available travel means. Then, based on the travel means information, the processor 190 computes the travel times from the respective parking lots to the destination and acquires estimated destination arrival time information about estimated times to arrive at the destination. Incidentally, the candidate travel route information to the destination and the travel distance information and the estimated destination arrival time information are associated with the parking information 21, which is then stored in the memory 170.

The processor 190 generates a parking list that lists the parking information based on the candidate parking information stored in the memory 170. Then, the parking lots listed in the parking list are displayed on the terminal display section 140 (Step S215). At this time, as shown in FIG. 11, the display controller 192B of the processor 190 superimposes on the map information location information 24, parking name information 23 and estimated arrival time information for each of the parking lots. When recognizing request information for displaying the parking list, which is set by the user's input operation, the processor 190 displays the parking list. As shown in FIG. 12, the parking list may contain, based on the candidate parking information and the public transportation information 31, a parking lot name, an estimated arrival time to the parking lot, vacancy and wait time of the parking lot, a travel time, a travel distance, a travel expense and travel means to the destination, an estimated arrival time at the destination, service information such as parking fee, additional service information, etc. for each of the parking lots. For a parking lot to which a travel route using a public transportation is set, a travel cost to the destination such as transportation fee of the public transportation is computed based on the public transportation information and displayed.

At this time, when, for instance, an item such as "travel distance to destination" or "estimated arrival time at destination" is selected by the user's input operation in FIG. 12, the processor 190 may rearrange the parking information based on the selected item. Specifically, for instance, when "travel distance to destination" is selected, the processor 190 rearranges the parking information in ascending orders of the travel distances to the destination.

Then, the processor 190 recognizes a parking selected by the user's input operation (Step S216).

Advantage of First Embodiment

As described above, in the first embodiment, the processor 190 acquires the map information, the current position information about the current position and the destination about the destination and operates the information retriever 196 to retrieve the parking information about the parking lots near the destination based on the map information. Then, the route searcher 195A of the route processor 195 sets the first travel routes from the current position to the parking lots and the second travel routes from the parking lots to the destination, the first and second travel routes and the locations of the parking lots being superimposed on the map information displayed on the terminal display section 140. Thus, since the travel routes to the parking lots near the destination and the travel routes from the parking lots to the destination can be searched for and displayed, conventional processing for retrieving parking lots after arriving at the destination is not necessary. Therefore, proper assist for travel of the vehicle can be provided.

When there is an available boarding/alighting zone of a public transportation near the destination, the information retriever 196 retrieves another boarding/alighting zone on a line of the said public transportation and a boarding/alighting zone on a line of another transitable public transportation to the said public transportation and then retrieves parking lots near these boarding/alighting zones. The route searcher 195A sets the travel route from the current position to these boarding/alighting zones. Thus, when a traffic-jam is predicted to arise near the destination, for instance, a travel route from a parking lot that is remote from the destination to the destination can be set so that the user can park the vehicle in the remote parking lot and travels to the destination using a public transportation. Therefore, when, for instance, an event site is selected as a destination and a traffic-jam is predicted to arise near the destination, the user can avoid getting involved in the traffic-jam. In addition, although a parking lot of such event site might be congested, since the arrangement allows the user to use a parking lot remote from the destination, the user can park the vehicle in the remote parking lot without difficulty.

The guidance notification controller 192 displays a travel cost required when traveling on the travel route using the public transportation in the parking list. Thus, the user can select a parking lot after checking locations of parking lots and travel costs required for using public transportations, so that the user can easily select a desired parking lot.

Then, the traffic-jam condition recognizer 194A recognizes change over time of a traffic-jam condition based on the time-series data 12*i* and generates the traffic-jam prediction information. The route searcher 195A sets the travel route based on this traffic-jam prediction information. Accordingly, the route searcher 195A sets the travel route that can avoid a traffic jam. Therefore, when, for instance, it is predicted to be involved in a traffic-jam near the destination, the route searcher 195A can navigate the vehicle to a parking lot before a traffic-jam zone where the traffic-jam is predicted to arise, thereby setting the travel route so as to allow the user to smoothly arrive at the destination.

The travel time computing section 195C of the route processor 195 computes the travel distance information from the current position to the parking lot and the travel distance information from the parking lot to the destination. Then, when the parking list is displayed and "distance to destination" is selected by the user's input operation, the parking information is rearranged in ascending order of the travel distances from the parking lots to the destination. Accordingly, when, for instance, the user does not desire a long walk from a parking lot to the destination, a parking lot with a short distance to the destination can be selected, and when the user desires to arrive at a parking lot as early as possible, a parking lot with a short distance from the current position can be selected. Therefore, the user can select a parking lot with ease.

The travel time computing section 195C computes the estimated arrival time to arrive at the parking lot and the estimated destination arrival time to arrive at the destination. Then, when the parking list is displayed and "estimated arrival time to destination" is selected by the user's input operation, the parking information is rearranged in ascending order of the estimated arrival times to arrive at the destination. Thus, the user can easily check which parking lot he/she should park the vehicle in order to arrive at the destination at the earliest time, whereby the navigation device 100 can provide guidance for a parking lot and a travel route that can allow the user to arrive at the destination at the earliest time.

The parking condition recognizer 194B of the traffic condition recognizer 194 recognizes the vacancy of the parking lots. Then, the vacancy of the parking lots is displayed in the parking list. Due to this, the user can promptly check which parking lot he/she can park the vehicle without waiting. Thus, by selecting a parking lot without a waiting time, the user can park the vehicle smoothly and arrive at the destination early.

Further, additional services provided by parking lots are listed and displayed in the parking list. Thus, the user can easily check the additional services provided by the parking lots, so that, for instance, a parking lot with a plenty of additional services can be selected.

When recognizing request information for applying for an additional service that is set by the user's input operation, the service application section 199 of the navigation device 100 transmits service application request information for applying for the additional service to a service server managing the parking lot. Accordingly, the user can promptly apply for a desired additional service from the navigation device.

Second Embodiment

Next, a second embodiment of the present invention will be described with reference to the attached drawings.

A communication navigation system of this embodiment is an example of a guidance notifying system of the present invention, and so designed to navigate a mobile body (e.g. a vehicle) for the travel or drive thereof. As in the case of the first embodiment, the guidance notifying system of the present invention is not necessarily designed to navigate a vehicle for the drive thereof, but may be so designed to notify traffic information regarding any type of mobile body.

Figure 13:
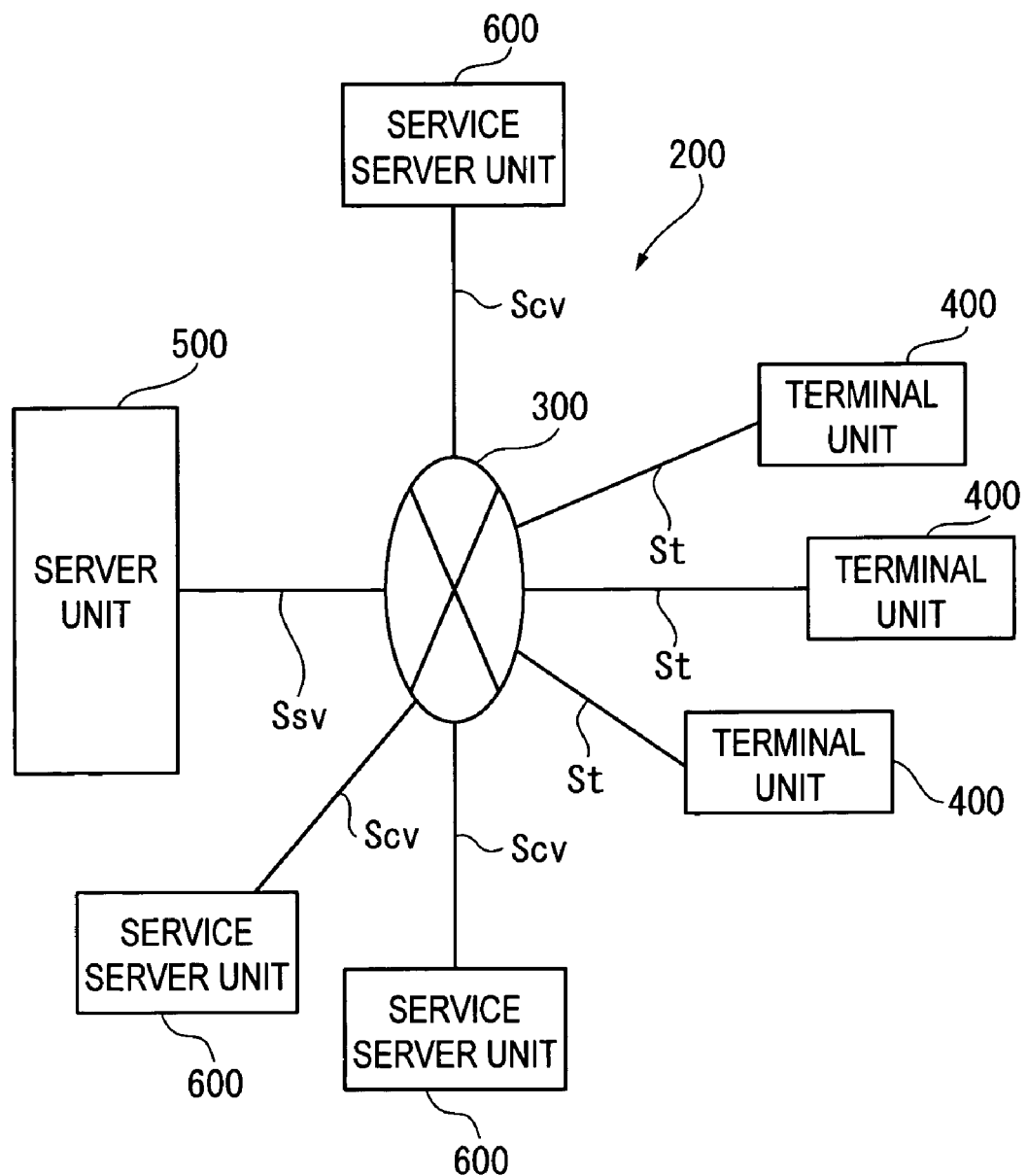
FIG. 13 is a block diagram schematically showing an arrangement of a navigation system according to a second embodiment of the present invention.

FIG. 13 is a block diagram briefly showing the arrangement of the navigation system of the present embodiment.

[Arrangement of Navigation System]

Referring to FIG. 13, the reference numeral 200 denotes the communication navigation system (guidance notifying system). The navigation system 200 notifies guidance on a travel along with a travel progress of a mobile body (e.g. a vehicle). The mobile body is not limited to vehicles, but includes any type of mobile body such as aircrafts and ships. The navigation system 200 has a network 300, a terminal unit 400 that also operates as a guidance notifying device, a server unit 500, a service server unit 600 and so on.

The network 300 is connected to the terminal unit 400 and the server unit 500. The network 300 interconnects the terminal unit 400, the server unit 500 and the service server unit so as to be capable of communicating therebetween. The network 300 may be the Internet based on a general-purpose protocol such as TCP/IP protocol, an intranet, a LAN (Local Area Network), a communication network and a broadcasting network that have a plurality of base stations capable of communicating by way of a radio medium, or the radio medium itself that enables direct communication between the terminal unit 400 and the server unit 500. The radio medium may be any one of electric waves, light beams, acoustic waves and electromagnetic waves.

Figure 14:
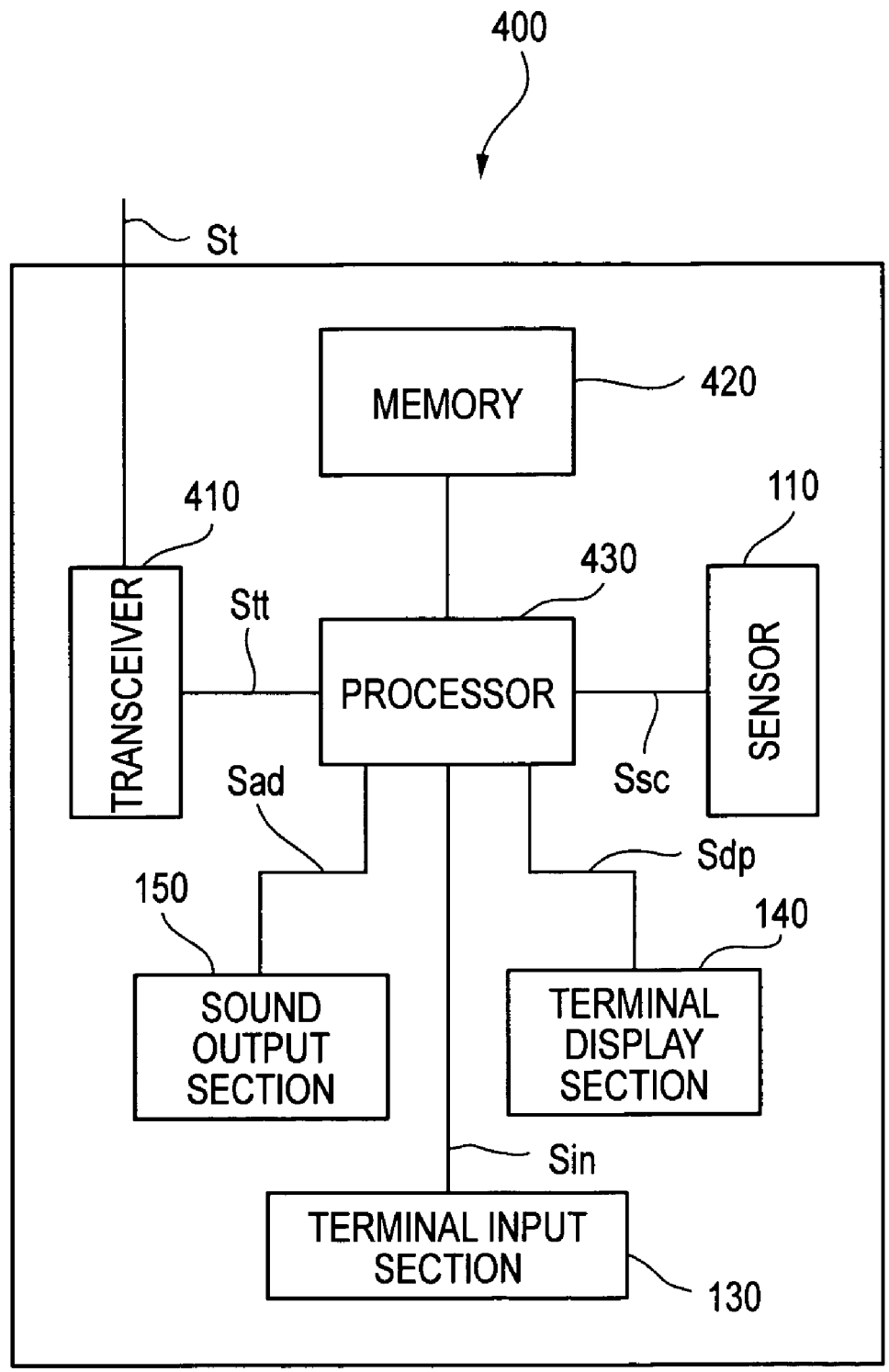
FIG. 14 is a block diagram schematically showing an arrangement of a terminal unit according to the second embodiment.

Similarly to the navigation device 100 of the first embodiment, the terminal unit 400 may be, for example, an in-vehicle unit installed in a vehicle as a mobile body, a portable unit, a PDA (Personal Digital Assistant), a portable phone, a PHS (Personal Handyphone System) or a portable personal computer. The terminal unit 400 acquires map information delivered by the server unit 500 via the network 300. On the basis of the map information, the terminal unit 400 retrieves and displays information about a current position and a destination, a route to the destination, predetermined shops nearby, and information about services provided by the shops. As shown in FIG. 14, the terminal unit 400 includes a transceiver 410 that operates as a terminal communicator, the sensor 110, the terminal input section 130, the terminal display section 140, a sound output section 150, a memory 420, a processor 430 and so on.

The transceiver 410 is connected to the server unit 500 via the network 300, while being connected to the processor 430. The transceiver 410 can receive a terminal signal St from the server unit 500 via the network 300. When acquiring the terminal signal St, the transceiver 410 performs preset input interface processing so as to output the terminal signal St as a processing terminal signal Stt to the processor 430. The transceiver 410 can also input the processing terminal signal Stt from the processor 430. When acquiring the processing terminal signal Stt to be input, the transceiver 410 performs preset output interface processing so as to send the processing terminal signal Stt as the terminal signal St to the server unit 500 via the network 300.

The sensor 110 detects the travel progress of the vehicle, i.e., the current position and the driving status, and outputs it as a predetermined signal Ssc to the processor 430.

The terminal input section 130 has various operation buttons and operation knobs (each not shown) to be used for input operations. The operation buttons and the operation knobs are used to input, for example, the settings for the operations of the terminal unit 400. More specifically, the operation buttons and the operation knobs may be used: to issue a command for executing a communication operation as communication request information for acquiring information via the network 300; to set the type of information to be acquired and acquiring criteria; to set a destination; to retrieve information; and to display the driving status (travel progress) of the vehicle. When the settings are input, the terminal input section 130 outputs a predetermined signal Sin to the processor 430 so as to apply the settings.

The terminal display section 140, under the control of the processor 430, displays a signal Sdp representing image data sent from the processor 430. The image data may be image data of the map information and the retrieval information sent from the server unit 500.

The sound output section 150, under the control of the processor 430, outputs and notifies various signals Sad as sounds from an audio section, the various signals Sad representing the sound data etc. sent from the processor 430.

The memory 420 appropriately stores various information acquired via the network 300, the settings that are input by the terminal input section 130, music data, image data and the like. The memory 420 also stores various programs that run on the OS (Operating System) controlling the whole operation of the terminal unit 400. The memory 420 may include drives or drivers for readably storing data on recording media such as a HD (Hard Disk) or an optical disc.

Figure 15:
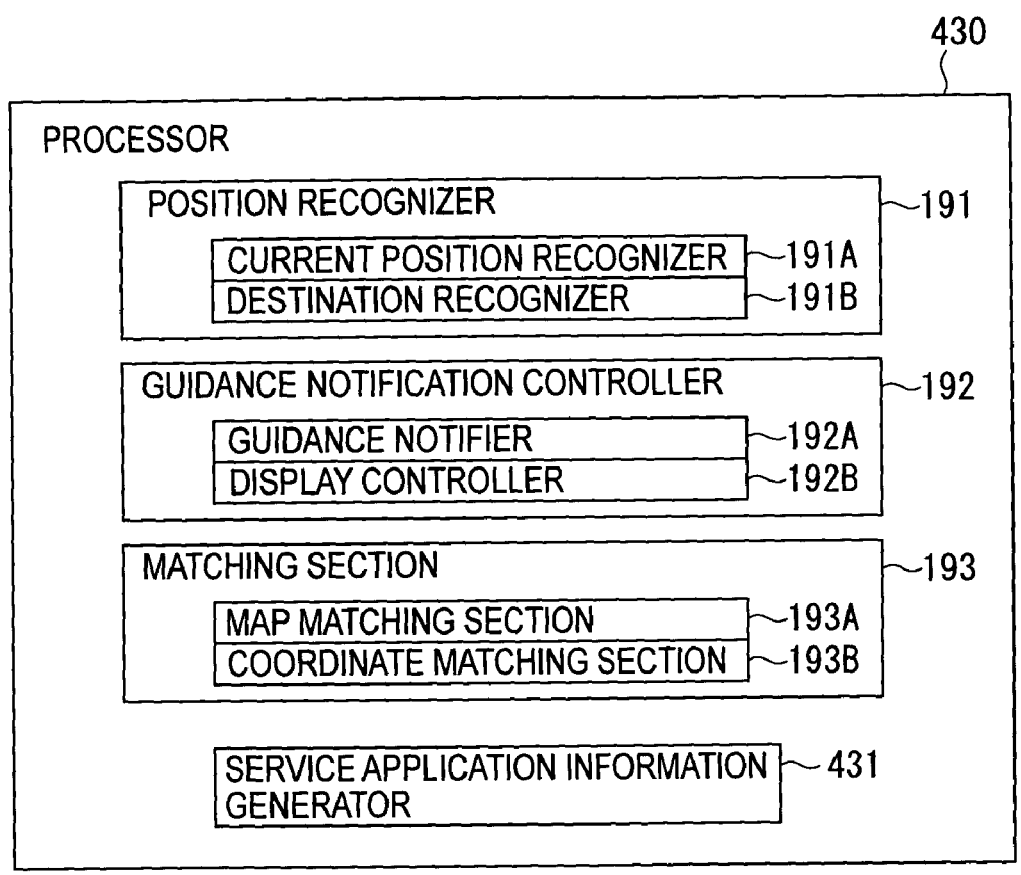
FIG. 15 is a block diagram schematically showing an arrangement of a processor of the terminal unit according to the second embodiment.

The processor 430 has various input/output ports (not shown) including a communication port connected to the transceiver 410, a GPS receiving port connected to a GPS receiver of the sensor 110, sensor ports respectively connected to various sensors of the sensor 110, a key input port connected to the terminal input section 130, a display control port connected to the terminal display section 140, a sound control port connected to the sound output section 150 and a storage port connected to the memory 420. As shown in FIG. 15, the processor 430 has, as various programs, the position recognizer 191, the guidance notification controller 192, the matching section 193, a service application information generator 431 as an additional service information acquirer, and the like.

The position recognizer 191 includes the current position recognizer 191A, the destination recognizer 191B and the like.

The current position recognizer 191A recognizes the current position of the vehicle. Various information acquired by the current position recognizer 191A is appropriately stored in the memory 420.

The destination recognizer 191B typically acquires the destination information about the destination set by the input operation at the terminal input section 130 and recognizes the position of the destination. Such destination information recognized by the destination recognizer 191B is appropriately stored in the memory 420.

The guidance notification controller 192 controls notification of a travel route of the vehicle. The guidance notification controller 192 includes the guidance notifier 192A, the display controller 192B, and the like.

The guidance notifier 192A provides guidance stored in the memory 420 on the basis of travel route information and feature guidance information acquired in advance according to the driving status of the vehicle. The guidance is related to the travel of the vehicle, which may be the content for assisting the drive of the vehicle.

Figure 11:
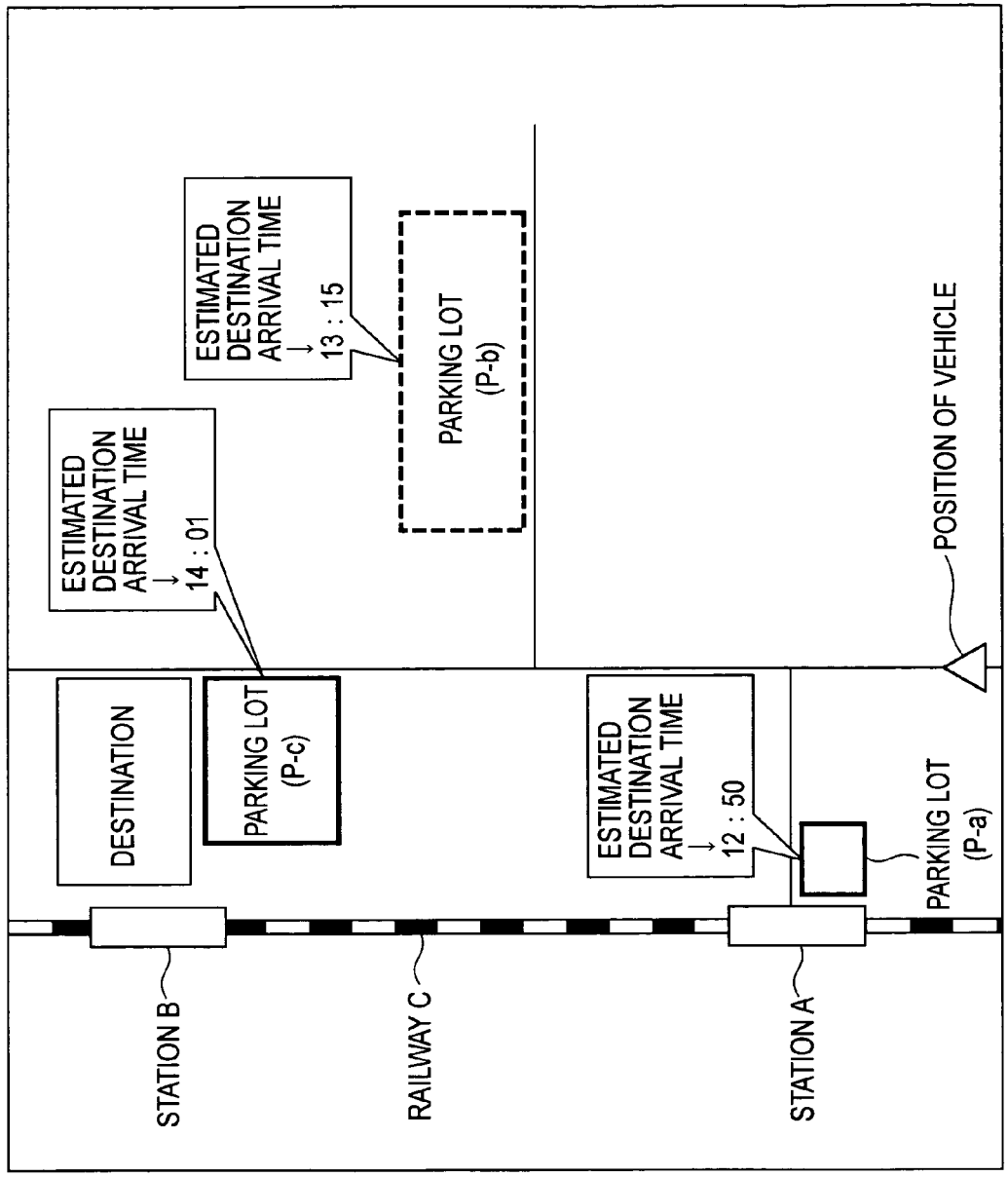
FIG. 11 is a schematic diagram showing a display screen of the travel route according to the first embodiment.

The display controller 192B controls the terminal display section 140 to display a guidance display screen as shown in FIGS. 11 and 12 or guidance for the travel route of the vehicle, based on the information transmitted from the server unit 500.

The matching section 193 performs matching processing for superimposing the current position of the vehicle and positions of facilities such as shops on the map information. The matching section 193 includes the map matching section 193A, the coordinate matching section 193B and the like.

The map matching section 193A performs the map matching processing for displaying the current position recognized by the current position recognizer 191A based on the map information acquired from the server unit 500.

The coordinate matching section 193B performs the coordinate matching processing for determining whether or not point information about nodes N contained in the matching data MM of the map information acquired from the server unit 500 indicates an identical point.

The service application information generator 431 generates service application request information for applying for an additional service based on additional service information of detailed-parking-service information contained in the parking information 21. Specifically, the service application information generator 431 acquires request information for requesting application for the additional service which is set by the user's input operation. The request information contains personal information such as a name and a contact of the user and additional service information about the additional service the user desires to apply for. Then, the service application information generator 431 recognizes parking information 21 of a parking lot providing the additional service contained in the request information and acquires a parking ID 22 of the parking lot. Then, the service application information generator 431 generates service application request information with which the personal information of the user service information about the additional service desired by the user, the parking ID 22 and the like are associated. Thereafter, the service application information generator 431 controls the transceiver 410 to transmit the service application request information to the server unit 500.

Figure 16:
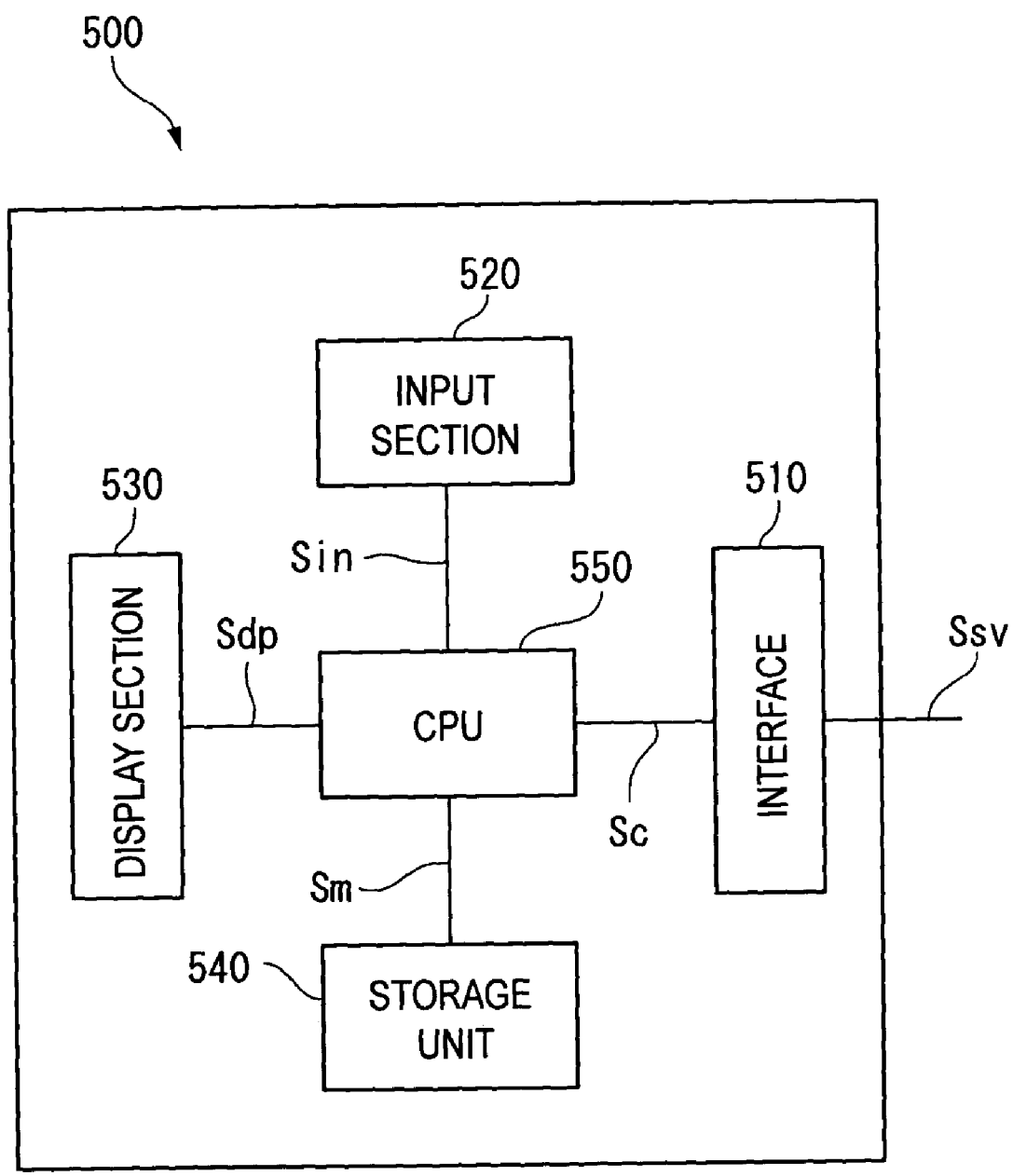
FIG. 16 is a block diagram schematically showing an arrangement of a server unit according to the second embodiment.

The server unit 500 can transmit/receive information to/from the terminal unit 400 via the network 300. The server unit 500 is capable of acquiring various information from other server units (not shown) of various government offices such as Meteorological Agency and National Police Agency, private organizations, VICS and business enterprises via the network 300. The information to be acquired may be travel information for the vehicle, i.e., various travel related information used during the travel of the vehicle such as weather information, VICS data including traffic jam, traffic accidents, constructions and traffic controls, and shop information about various shops including gasoline stations and restaurants etc. As shown in FIG. 16, the server unit 500 includes an interface 510, an input section 520, a display section 530, a storage unit 540, a CPU (Central Processing Unit) 550 and so on.

The interface 510 performs a preset input interface processing over a server signal Ssv input via the network 300 so as to output the server signal Ssv as a processing server signal Sc to the CPU 550. When the processing server signal Sc to be sent to the terminal unit 400 or the service server unit 600 is input in the interface 510 from the CPU 550, the interface 510 performs preset output interface processing over the input processing server signal Sc so as to output the processing server signal Sc as a server signal Ssv to the terminal unit 400 or the service server unit 600 over the network 300. Note that the server signal Ssv can be appropriately output only to a predetermined terminal unit 400 or the service server unit 600 on the basis of the information described in the processing server signal Sc.

Similarly to the terminal input section 130, the input section 520, which may be a keyboard, a mouse or the like, has various operation buttons and operation knobs (each not shown) to be used for input operations. The operation buttons and the operation knobs are used: to input the settings for operations of the server unit 500; to set information to be stored in the storage unit 540; and to update the information stored in the storage unit 540. When the settings are input, the input section 520 outputs a signal Sin corresponding to the setting to the CPU 550 so as to apply the settings. In place of the input operation using the operation buttons and the operation knobs, input operation using a touch panel arranged on the display section 530, sound input operation and the like may be employed for inputting various settings.

The display section 530, just like the terminal display section 140, displays a signal Sdp representing image data sent from the CPU 550 under the control of the CPU 550. The image data may be those acquired from the storage unit 540 and those acquired from external server units via the network 300.

The storage unit 540 readably stores various information received from the terminal unit 400 and external server units such as the map information as shown in FIGS. 2 and 3, the traffic-jam condition prediction table 10 as shown in FIG. 4, the parking information table 20 as shown in FIG. 5 and the public transportation information table 30 as shown in FIG. 6. The storage unit 540 also readably stores the calendar template 40 associated with the terminal units 400 connected to the server unit 500 over the network 300 as shown in FIG. 7.

Note that the storage unit 540 may include drives or drivers for readably storing data on recording media such as a HD (Hard Disk), a DVD (Digital Versatile Disc), an optical disc and a memory card. Information to be stored may include, for example, information input by the input operation at the input section 520, and content of the information stored with the input operation can be appropriately updated. The storage unit 540 also stores information such as various programs that run on an OS (Operating System) controlling the whole operation of the server unit 500 and the navigation system 200.

The storage unit 540 typically stores retrieval information for acquiring information of a predetermined point in the map information. More specifically, the retrieval information provided upon the retrieval request from the terminal unit 400 includes various information about content and guidance such as names of states, cities, regions and points, which are units used to gradually divide the map information into smaller areas, as well as various information about shops as points. The retrieval information is structured in a tree structure table so that plural pieces of item information are hierarchically associated with each other.

The storage unit 540 stores personal information about users who use the navigation system 200 with the terminal unit 400. The personal information may include a name and an address, a user ID number and a password assigned to each user, a type of the terminal unit 400 for the use of the navigation system 200, and an address number of the terminal unit 400 used for transmitting/receiving information to/from the terminal unit 400.

In addition, the storage unit 540 stores service server information about the service server unit 600 installed in a parking lot. The service server information may include a parking address information used to communicate with a service server unit 600 installed in, for instance, the parking corresponding to the parking ID 22 and the like. The parking address information may include an e-mail address, IP (Internet Protocol) address, etc. of the service server unit 600 which is used for identifying the service server unit 600 installed in the parking lot. Furthermore, the storage unit 540 stores various information used for performing the navigation processing in a manner readable by the CPU 550.

Figure 17:
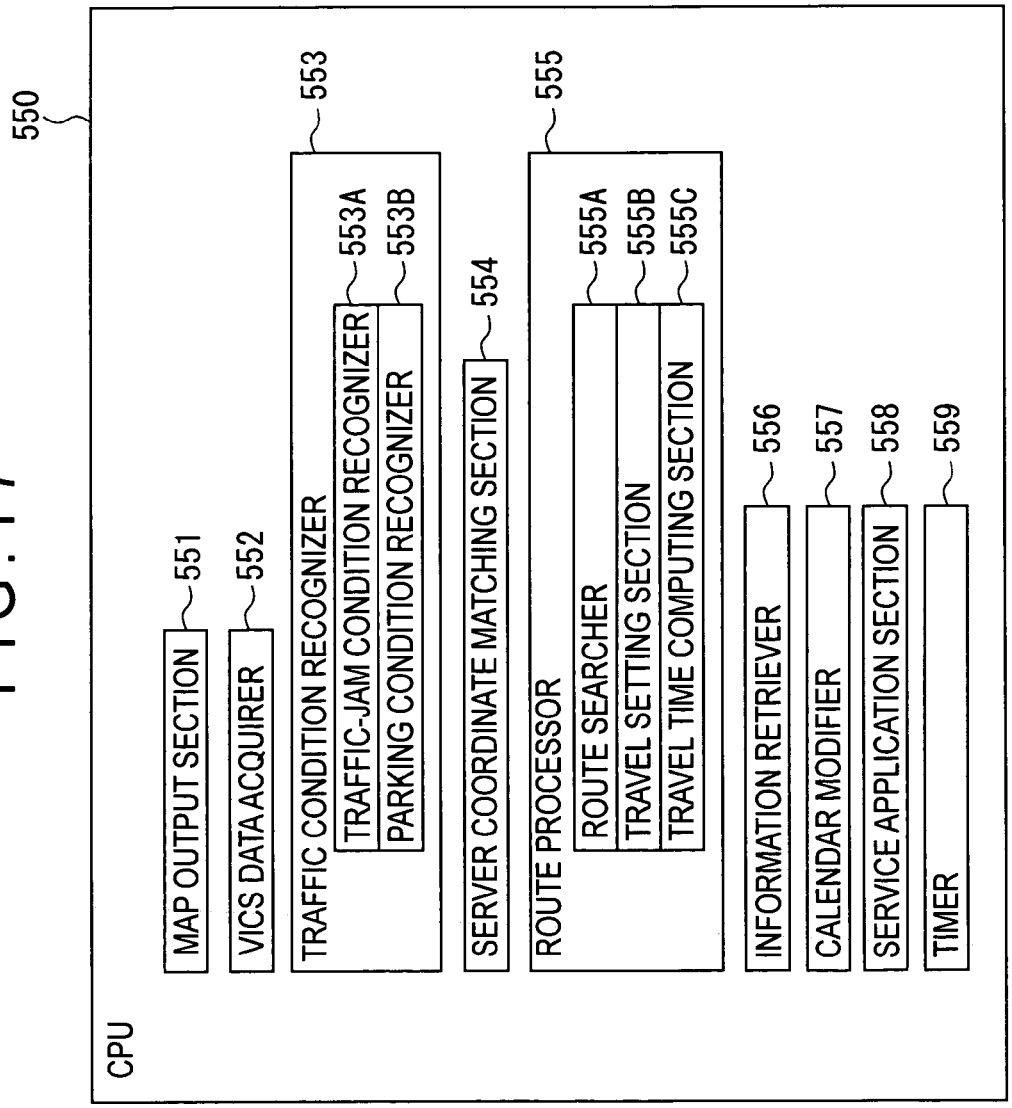
FIG. 17 is a block diagram schematically showing an arrangement of a CPU of the server unit according to the second embodiment.

As shown in FIG. 17, the CPU 550 includes, as various programs stored in the server storage unit 540, a map output section 551, a VICS data acquirer 552, a traffic condition recognizer 553, a server coordinate matching section 554, a route processor 555, an information retriever 556, a calendar modifier 557, a service application section 558, a timer 559 and the like.

The map output section 551 responds to the input of the processing server signal Sc to refer to the information requesting a delivery of the information about the map information contained in the processing server signal Sc, and retrieves the requested information from the map information stored in the storage unit 540, e.g., the display data VM and matching data MM corresponding to a predetermined area to read it out as the memory signal Sm. The map output section 551 appropriately converts the read memory signal Sm into a processing server signal Sc, outputs the processing server signal Sc to a predetermined or all terminal units 400 via the interface 510 and the network 300 on the basis of the processing server signal Sc, and delivers the requested information contained in the map information.

The VICS data acquirer 552, just like the VICS receiver 120 of the first embodiment, responds to the input of the processing server signal Sc and refers to the information about the request for the route search contained in the processing server signal Sc so as to acquire the VICS data from the VICS (not shown).

The traffic condition recognizer 553 responds to the input of the processing server signal Sc and refers to the information about the request for the route search contained in the processing server signal Sc so as to generate current traffic condition information as the memory signal Sm based on the VICS data acquired by the VICS data acquirer 552. The traffic condition information may include current traffic-jam information about a traffic-jam condition, a traffic-jam prediction information, parking condition information and the like. The traffic condition recognizer 553 includes a traffic-jam condition recognizer 553A, a parking condition recognizer 553B and the like.

The traffic-jam condition recognizer 553A responds to the input of the processing server signal Sc and refers to the information about the request for the route search contained in the processing server signal Sc so as to generate current traffic-jam information as the memory signal Sm based on the VICS data.

Also, the traffic-jam condition recognizer 553A, just like the traffic-jam condition recognizer 194A of the first embodiment, responds to the input of the processing server signal Sc and refers to the information about the request for the travel route search based on the traffic-jam information and the traffic-jam prediction contained in the processing server signal Sc so as to generate traffic-jam prediction information as the memory signal Sm. Then, the traffic-jam condition recognizer 553A appropriately converts the generated memory signal Sm into a processing server signal Sc, outputs the processing server signal Sc to a predetermined or all terminal units 400 via the interface 510 and the network 300 on the basis of the processing server signal Sc, and notifies a current traffic-jam condition and a predicted traffic-jam condition that might arise before arriving at the destination.

The parking condition recognizer 553B responds to the input of the processing server signal Sc and refers to the information about a request for checking vacancy of the parking lot contained in the processing server signal Sc so as to generate current parking condition information as the memory signal Sm based on the VICS data, which is similar to the first embodiment.

The parking condition recognizer 553B responds to the input of the processing server signal Sc and refers to the information about a request for checking vacancy of the parking lot based on predicted vacancy of the parking lot contained in the processing server signal Sc so as to generate parking vacancy prediction information as the memory signal Sm based on the traffic condition prediction table stored in the storage unit 540, which is similar to the first embodiment.

The server coordinate matching section 554, just like the above-described coordinate matching section 193B of the terminal unit 400, performs the coordinate matching processing for determining whether or not point information about nodes N contained in the matching data MM of the map information indicate an identical point.

The route processor 555 includes a route searcher 555A, a travel setting section 555B, a travel time computing section 555C and the like.

The route searcher 555A, just like the route processor 195 of the first embodiment, responds to the input of the processing server signal Sc and refers to the information about the request for the route search contained in the processing server signal Sc so as to generate travel route information as the memory signal Sm. Then, the route searcher 555A appropriately converts the generated memory signal Sm into a processing server signal Sc, outputs the processing server signal Sc to a predetermined or all terminal units 400 via the interface 510 and the network 300 on the basis of the processing server signal Sc, and notifies the travel route and the required time.

The travel setting section 555B, just like the travel setting section 195B of the first embodiment, responds to the input of the processing server signal Sc and refers to the information about the request for the route search contained in the processing server signal Sc so as to generate travel setting information as the memory signal Sm.

The travel time computing section 555C, just like the travel time computing section 195C of the first embodiment, responds to the input of the processing server signal Sc and refers to the information about the request for the route search contained in the processing server signal Sc so as to generate travel distance information, estimated parking arrival time information and estimated destination arrival time as the memory signal Sm.

The information retriever 556, just like the information retriever 196 of the first embodiment, responds to the input of the processing server signal Sc and refers to the information about a retrieval request for retrieval information contained in the processing server signal Sc so as to hierarchically retrieve the retrieval information stored in the storage unit 540 typically on the basis of item information and read it as the memory signal Sm. Then, the information retriever 556 appropriately converts the generated memory signal Sm into a processing server signal Sc, outputs the processing server signal Sc to a predetermined or all terminal units 400 via the interface 510 and the network 300 on the basis of the processing server signal Sc, and delivers the retrieval information.

The information retriever 556, just like the information retriever 196 of the first embodiment, responds to the input of the processing server signal Sc and refers to the information about the retrieval request for the retrieval information contained in the processing server signal Sc so as to generate candidate parking information on the basis of parking information table 20 and the public transportation information table 30 stored in the storage unit 540 as the memory signal Sm.

The calendar modifier 557 responds to the input of the processing server signal Sc and recognizes information contained in the processing server signal Sc, which may be calendar-modification request information requesting the modification of the calendar template 40 and terminal specific information such as ID numbers for identifying a terminal unit 400 that generated the calendar-modification request information. Then, the calendar modifier 557, just like the calendar modifier 197 of the first embodiment, appropriately updates the calendar template 40 stored in the storage unit 540 and associated with the terminal unit 400 identified by the terminal specific information stored in the storage unit 540.

The service application section 558 responds to input of the processing server signal Sc and refers to service application request information for applying for an additional service contained in the processing server signal Sc, the service application section 558 then recognizing parking information 21 about a parking lot to which the additional service is applied for. Then, based on the parking ID 22, the service application section 558 acquires the parking address information about the parking lot to which the additional service is applied for, and transmits service application information for applying for the additional service to a service server unit 600 of the parking lot contained in the parking address information. The service application information may contain the destination information and the estimated parking arrival time information acquired by the route processor in addition to the personal information of the user contained in the service application request information and additional service information to be applied for.

When receiving service application completion information indicating that the application for the service has been completed from the service server unit 600, the service application section 558 generates application-completion notifying information for notifying the completion of the application for the service, which is transmitted to the terminal unit 400.

The timer 559 recognizes the current time typically based on the pulse of an internal clock. Then, the timer 559 appropriately outputs time information about the recognized current time.

The CPU 550 responds to the signal Sin input from the input section 520 by the input operation at the input section 520, and appropriately performs computation based on the content corresponding to the input operation to generate a signal Sdp. Then, the CPU 550 appropriately outputs the generated various signals to the display section 530, the interface 510 and the storage unit 540 and operates them so as to execute the input content.

Figure 18:
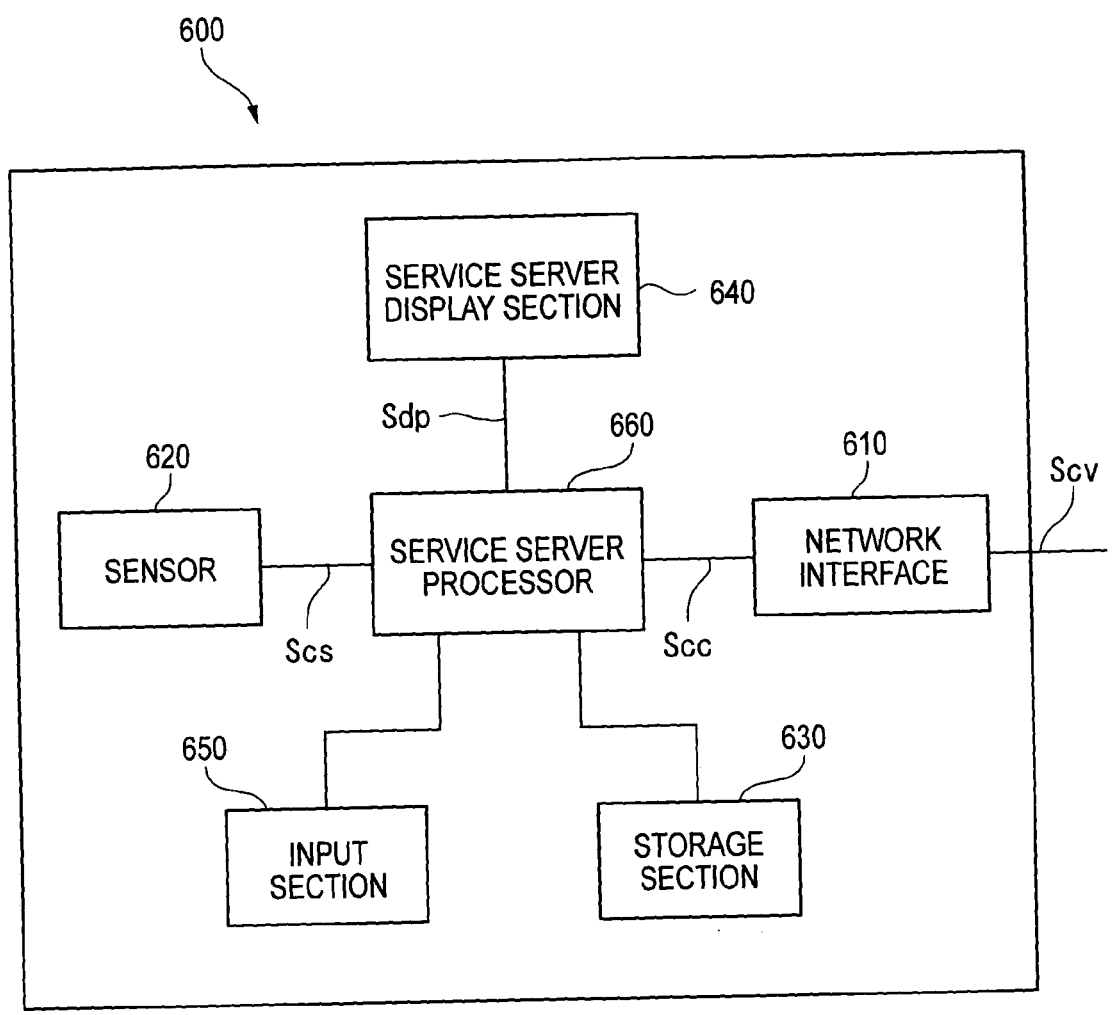
FIG. 18 is a block diagram schematically showing an arrangement of a service server unit according to the second embodiment.

The service server unit 600 is installed in a facility such as a parking lot and a shop. The service server unit 600 is so installed as to be capable of transmitting/receiving the service application information transmitted from the service unit 500, the service server unit 600 performing reservation processing of the additional service in response to reception of the service application information. Note that the service server unit 600 may not be installed in all parking lots, and may be, for instance, a unit for collectively managing a plurality of parking lots and shops. As shown in FIG. 18, the service server unit 600 includes a network interface 610, a sensor 620, a storage section 630, a service server display section 640, an input section 650, a service server processor 660 and so on.

The network interface performs a preset input interface processing over a service server signal Scv input via the network 300 so as to output the service server signal Scv as a processing service server signal Scc to the service server processor 660. When the processing service server signal Scc to be sent to the server unit 500 is input to the network interface 610 from the service server processor 660, the network interface 610 performs preset output interface processing over the input processing service server signal Scc so as to output the processing service server signal Scc as a server signal Scv to the server unit 500 over the network 300.

The sensor 620 detects a condition of a parking lot to output as a predetermined signal Scs to the service server processor 660. The sensor 620 includes a parking space sensor (not shown), an entrance sensor (not shown) and the like. The parking space sensor is provided to each parking space in the parking lot to detect whether each parking space is occupied by a vehicle or not. The entrance sensor is provided to an entrance of the parking lot to count the number of vehicles to go in and out from the parking lot.

The storage section 630 readably stores a parking condition information table 50 as shown in FIG. 19, a service content information table 60 as shown in FIG. 20, a service reservation information table 70 as shown in FIG. 21 and the like. Note that the storage section 630 may include drives or drivers for readably storing data on recording media such as a HD (Hard Disk), a DVD (Digital Versatile Disc), an optical disc and a memory card. Information to be stored may include, for example, information input by the input operation at the input section 650, and content of the information stored with the input operation can be appropriately updated. The storage section 630 also stores various programs that run on the OS (Operating System) controlling the whole operation of the service server unit 600.

As shown in FIG. 19, the parking condition information table 50 is structured in a table containing a parking space ID 51, parking condition information 52 and the like. The parking condition information table 50 contains a parking condition of each parking space in a parking lot based on the parking space sensor in the sensor 110.

The parking space ID 51 is information for identifying a parking space, which is associated with and added to the parking condition information. The parking space ID 51 is assigned to each parking space of a parking lot.

The parking condition information 52 is information related to a parking condition of each parking space. For instance, the parking condition information 52 is indicated as "parked" when a parking space of a parking lot is occupied by a vehicle, while the parking condition information 52 is indicated as "vacant" when the parking space is not occupied by a vehicle. Further, for instance, when the parking space is reserved in response to the service application information from the server unit 500, the parking condition information 52 is indicated as "reserved", while when the parking space cannot be used due to a damaged surface or the like, the parking condition information 52 is indicated as "not available". Incidentally, information for indicated in the parking condition information 52 may be any information as long as it shows the parking condition as described above, and numbers may be employed such as "01" representing "parked", "10" representing "vacant", "11" representing "reserved" and "00" representing "not available".

The service content information table 60 contains information about additional services that are available in the parking lot in which the service server unit 600 is installed. The service content information table 60, as shown in FIG. 20 for instance, is structured in a table containing a service ID 61, a service content information 62 and the like.

The service ID 61 is identification information for identifying each additional service, which is associated with the service content information 62. The service ID information is assigned to each additional service.

The service content information 62 is information about content of the additional service. The service content information 62 is information containing the content of the additional service such as "parking reservation service", "courtesy ticket service", "discount ticket service for shop ○○".

The service reservation information table 70 contains information about an additional service for which the user of the parking has made a reservation. The service reservation information 71 is structured in a table containing plural pieces of the service reservation information 71 generated based on the service application information transmitted from the server unit 500. The service reservation information 71 is information about a service reservation that has been made by the user or the parking lot. When, for instance, the user applies for an additional service, a piece of service reservation information 71 is newly added, and when the additional service is provided to the user, the service reservation information 71 is deleted. The service reservation information 71 is structured in a single data structure with which a reservation ID 72, a service ID 73, applicant information 74, estimated arrival time information 75, parking reservation information 76 and the like are associated.

The reservation ID 72 is identification information for identifying the service reservation information 71 that contains the reservation ID 72, the reservation ID 72 being associated with the service ID 73, the applicant information 74, the estimated arrival time information 75, the parking reservation information 76 and the like.

The service ID 73 corresponds to the service ID 61 contained in the service content information table 60. The service ID 73 may contain plural pieces of information. For instance, as shown in FIGS. 20 and 21, when a service ID 73 of a piece of service reservation information 71 indicates "1" and "2", the service content information 62 "parking reservation service" and "ticket sales service" corresponding to these numbers in the service content information table 60 are recognized.

The applicant information 74 contains personal information about a user who applies for an additional service. The applicant information 74 is generated based on the personal information contained in the service application information transmitted from the server unit 500. The personal information may include terminal specific information for identifying the terminal unit 400 in addition to individual name information about a name of the user and contact information such as an address and telephone number. The applicant information 74 may also be an identification number for identifying an individual such as a membership number which is generated for personal information of a user that has been stored in the service server unit 600 in advance.

The estimated arrival time information 75 is information about an estimated time at which the vehicle arrives at the parking lot. The estimated arrival time information 75 is generated based on the estimated parking arrival time information contained in the service application information transmitted from the server unit 500.

The parking reservation information 76 is information about a position of a parking space to park the vehicle in a case where the service ID 73 contains parking reservation service indicating "1". The parking reservation information 76 typically contains a parking space ID 51 corresponding to a parking space that is vacant based on the vacancy of the parking space recognized by the sensor 620. The parking space designated by the parking reservation information 76 is reserved as a parking space that is only available to the user who has applied for the parking reservation service but not available to other vehicles entering the parking lot. Incidentally, it may be so arranged that the parking space designated by the parking reservation information 76 is available to other vehicles entering the parking lot only when there are other vacant parking spaces. In such arrangement, another vacant parking space is newly registered as parking reservation information 76 to be saved.

Incidentally, the service reservation information may contain other necessary information required for registration of the additional service in addition to the information described above.

Furthermore, the storage section 630 stores various information and various programs that are used when performing such service registration processing in a manner readable by the service server processor 660.

The service server display section 640, just like the terminal display section 140 and the display section 530, displays a signal Sdp representing various data sent from the service server processor 660 under the control of the service server processor 660. The various data may include image data and service information acquired from the storage section 630 and the image data acquired from external server units via the network 300.

Similarly to the terminal input section 130, the input section 650, which may be a keyboard, a mouse or the like, has various operation buttons and operation knobs (each not shown) to be used for input operations. The operation buttons and the operation knobs are used: to input the settings for operations of the service server unit 600; to set information to be stored in the storage section 630; and to update the information stored in the storage section 630.

Figure 22:
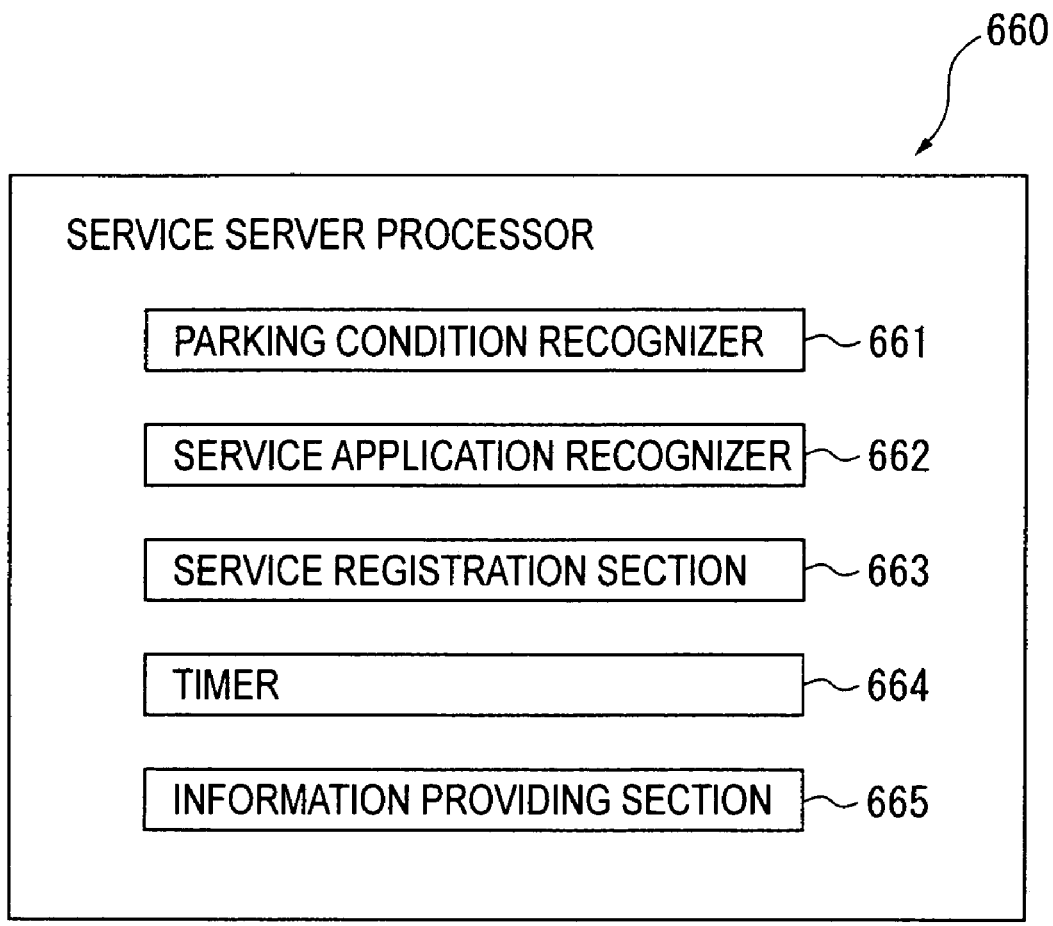
FIG. 22 is a block diagram schematically showing an arrangement of a service server processor of the service server unit according to the second embodiment.

The service server processor 660 includes, as various programs stored in the storage section 630, a parking condition recognizer 661, a service application recognizer 662, a service registration section 663, a timer 664, an information providing section 665 and the like as shown in FIG. 22.

The parking condition recognizer 661 controls the sensor 620 to recognize vacancy of a parking lot. Specifically, the parking condition recognizer 661 controls the sensor 620 to recognize vacancy of parking spaces and appropriately updates the parking condition information table 50 stored in the storage section 630. For instance, based on information about a parking condition acquired from the sensor 620 that is provided to each parking space, the parking condition recognizer 661 stores the information about the parking condition in parking condition information 52 corresponding to each parking space ID 51. The parking condition recognizer 661 obtains ratio of the number of vehicles entering a parking lot and the number of vehicles exiting from the parking lot, which is acquired from the entrance sensor of the parking lot, to recognize whether the parking lot tends to be congested or tends to have vacant parking spaces.

The service application recognizer 662 responds to the input of the processing service server signal Scc and recognizes service application information contained in the processing service server signal Scc. The service application information may include the personal information of the user to apply for the additional service, the service content, the estimated parking arrival time, the destination information and the like. The service application recognizer 626 recognizes the service application information that is input at the input section 650 as described above.

The service registration section 663 generates service reservation information 71 by acquiring information necessary for the additional service from the service application information recognized by the service application recognizer 662. The service registration section 663 registers the generated service reservation information 71 to the service reservation information table 70. Specifically, the service registration section 663 recognizes a service ID 73 by acquiring its service content information from information about a service contained in the service application information. The service registration section 663 generates the applicant information 74 based on the personal information of the user who applies for the additional service contained in the service application information and generates the estimated arrival time information 75 based on the estimated arrival time information 75. When information for applying for the parking reservation service is contained in the service content, the parking condition recognizer 661 recognizes a vacant parking space and designates a parking space ID of the vacant parking space. Once the service reservation information 71 is registered in the service reservation information table 70, the service registration section 663 transmits to the server unit 500 registration completion information that indicates that reservation registration of the additional service has been completed.

Further, the service registration section 663 deletes unnecessary service reservation information 71 from the service reservation information table 70. For instance, when recognizing request information for deleting service reservation information input at the input section 650 after an additional service is provided to the user or when an additional service is canceled, the service registration section 663 deletes the subjected service reservation information 71 from the service reservation information table 70. Note that it may be so arranged that service reservation information 71 is automatically deleted when a predetermined time that has been preset in advance based on the estimated arrival time information 75 of the service reservation information 71 has elapsed.

The timer 664 recognizes the current time typically based on the reference pulse of an internal clock. Then, the timer 664 appropriately outputs time information about the recognized current time.

The information providing section 665 transmits the registration completion information registered by the service registration section 663 to the server unit 500. The information providing section 665 also transmits information about facilities such as parking lots and shops to the server unit 500. Further, the information providing section 665 transmits parking vacancy information about vacancy of parking lots to the server unit 500.

[Operation of Navigation System]

Now, the operation of the navigation system 200 will be described with reference to the attached drawings. The processing similar to that of the first embodiment will be described only briefly.

(Route Search Processing)

Now, the route search processing as one of operations of the navigation system 200 will be described with reference to the drawings.

Figure 23:
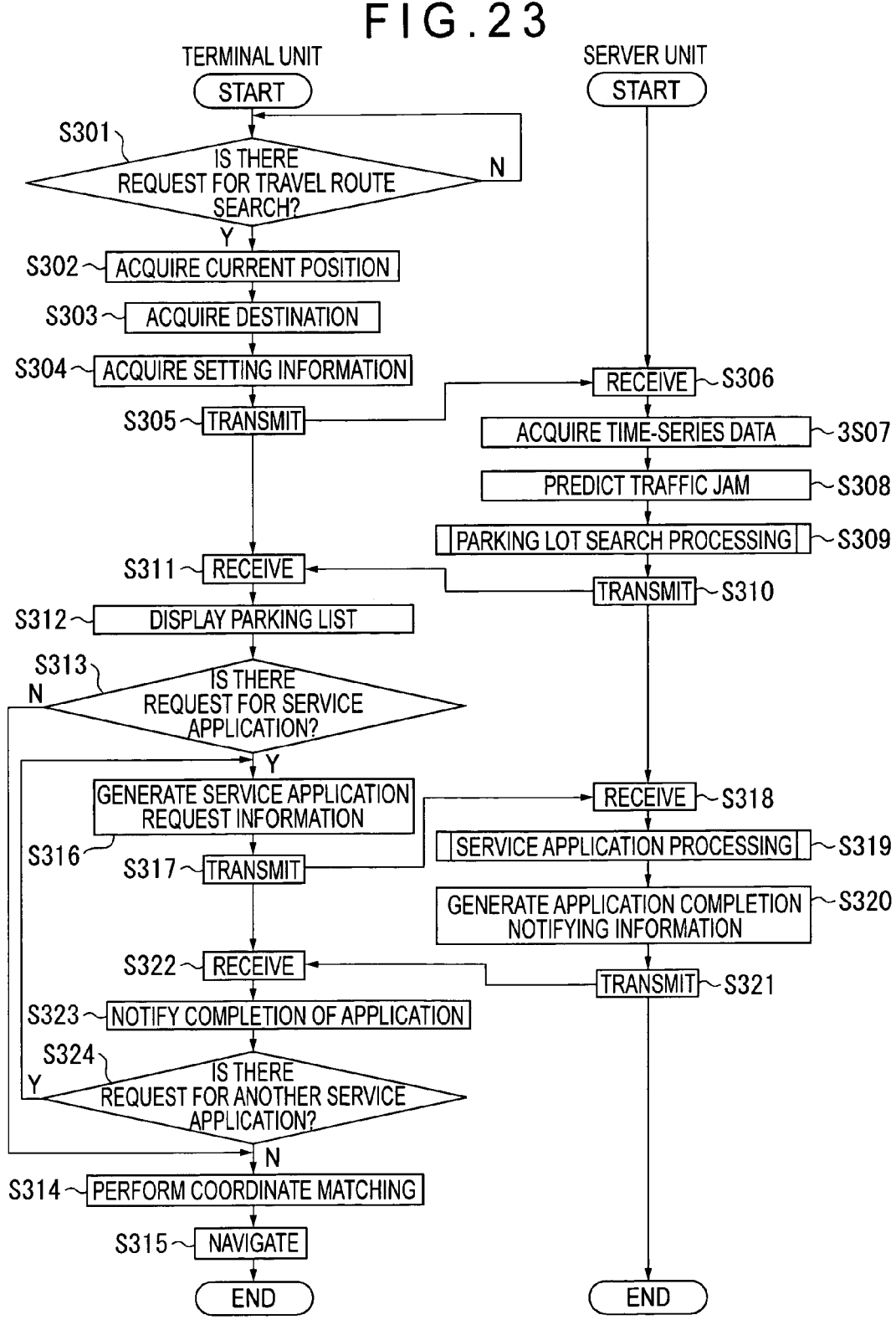
FIG. 23 is a flow chart showing route search processing according to the second embodiment.

Firstly as shown in FIG. 23, the user operates the terminal input section 130 to set a command for route search processing. When the processor 430 recognizes the set command for searching for a travel route (Step S301), the processor 430 operates the terminal display section 140 to display a screen for prompting the user to set various information necessary for travel route search such as the destination, the setting information about the preference for shortest travel distance or shortest travel time and the necessity of traffic-jam prediction.

When the processor 430 recognizes the various information necessary for the travel route search, the current position recognizer 191A acquires the current position information about the current position (Step S302) and the destination recognizer 191B acquires the destination information about the set destination (Step S303). The processor 430 also acquires the setting information about the settings that have been input (Step S304). The setting information may include, for instance, request information for searching for parking lots near the destination. The acquired current position information, destination information and setting information are appropriately stored in the memory 420.

Thereafter, the processor 430 controls the transceiver 410 to transmit the current position information, the destination information and the setting information stored in the memory 420 as well as a signal requesting the travel route search to the server unit 500. When transmitting the various information, the transceiver 410 also transmits the terminal specific information for identifying the terminal unit 400 (Step S305).

When receiving the various information transmitted from the terminal unit 400 (Step S306), the server unit 500 readably stores the various information in the storage unit 540.

Then, the CPU 550 acquires time information from the timer 559 to recognize the current date from the acquired time information. The traffic condition recognizer 553 of the CPU 550 then reads out the calendar template 40 associated with the terminal unit 400 that requested the travel route search from the storage unit 540 on the basis of the terminal specific information received in Step S306. Thereafter, the traffic condition recognizer 553 retrieves and recognizes the classification ID number of the recognized date from the read calendar template 40. Also, the traffic condition recognizer 553 recognizes the current position and the destination from the current position information and the destination information received in Step S306. Then, the traffic-jam condition recognizer 553A of the traffic condition recognizer 553 retrieves and acquires the time-series data 12*i* corresponding to the recognized classification ID number and containing the current position and the destination from the traffic condition prediction table 10 stored in the storage unit 540 (Step S307).

Thereafter, the CPU 550 performs the processing of Step S408. More specifically, the traffic-jam condition recognizer 553A of the CPU 550 generates current traffic-jam information. Based on the current position information, the destination information, the setting information and the current traffic-jam information, the route processor 555 of the CPU 550 detects a plurality of travel routes and selects some of the travel routes on the basis of the acquired setting information to generate candidate travel route information about a plurality of candidate travel routes that meet the requirements of the user.

Further, the traffic-jam condition recognizer 553A of the CPU 550 acquires the current time and day from the timer 559. Then, based on the current traffic-jam information and the current time and day, the traffic-jam condition recognizer 553A estimates the estimated arrival time to arrive at an arbitrary spot on the respective candidate travel routes contained in the candidate travel route information generated by the route processor 555. Then, the traffic-jam condition recognizer 553A predicts the traffic-jam condition at the arbitrary spot on the respective candidate travel routes at the estimated arrival time on the basis of the time-series data 12i acquired in Step S307 and generates traffic-jam prediction information about the predicted traffic-jam condition (Step S308).

Next, searching processing for parking lots near the destination is performed (Step S309). This parking lot search processing will be described later.

When acquiring the parking candidate information in Step S309, the CPU 550 transmits from the interface 510 the parking candidate information with the terminal specific information for identifying the terminal unit 400.

When the terminal unit 400 receives transmission information from the server unit 500 (Step S311), the terminal unit 400 recognizes the candidate parking information contained in the transmission information. Then, the display controller 192B of the processor 430 controls the terminal display section 140 to display, for instance, lists of parking lots and travel routes as shown in FIGS. 11 and 12 based on the candidate parking information and to display information for prompting the user to select a parking lot (Step S312). When recognizing information indicating that the user has selected a parking lot by the input operation, the processor 430 controls the display controller 192B to display the candidate travel route information to the parking lot and information for prompting the user to select travel route information from the candidate travel route information.

Thereafter, the processor 430 recognizes various information set by the user's input operation. The various information may include the parking information selected by the user, the travel route information to the parking lot contained in the parking information, information about application for the additional service of the parking lot and the map information.

The processor 430 then recognizes whether or not the set various information contains information for requesting application for the additional service of the parking lot (Step S313). Here, when there is not contained information for requesting application for the additional service of the parking lot, the processor 430 performs processing for guiding the travel route to the parking lot based on the selected parking information and the travel route information. Specifically, the processor 430 recognizes the matching data MM of the map information and operates the coordinate matching section 193B to perform coordinate matching processing on the recognized matching data MM (Step S314) to recognize the arrangement of roads, i.e., the connection of roads, which is then stored in the memory 420. Then, under the control of the display controller 192B of the processor 430, the terminal display section 140 superimposes on the acquired map information an icon indicating the current position of the vehicle on the basis of the current position information as well as the travel route information about the travel route selected by the user, the traffic-jam prediction information, the required-time information and the current traffic-jam information, and the sound output section 150 appropriately outputs sounds for navigating the user (Step S315).

On the other hand, when it is recognized in Step S313 that request information for applying for the additional service of the parking lot is contained, the service application information generator 431 of the processor 430 generates service application request information. Specifically, the service application information generator 431 of the processor 430 generates, based on the request information for applying for the additional service which is set by the user's input operation, service application request information with which parking information of the parking lot to which the additional service is applied for, additional service information about the additional service to be applied for, personal information such as a name, a telephone number and a membership number of the user are associated (Step S316).

The processor 430 transmits the service application request information from the transceiver 410 to the server unit 500 via the network 300 (Step S317). At this time, the terminal specific information for identifying the terminal unit 400 is transmitted together with the service application request information.

When the server unit 500 receives various information transmitted from the terminal unit 400 (Step S318), the server unit 500 recognizes the service application request information contained in the various information. Then, the service application section 558 of the CPU 550 communicates with the service server unit 600 installed in each parking lot based on the service application request information to perform service application processing (Step S319).

Thereafter, when receiving registration completion information indicating that the reservation of the additional service is registered from the service server unit 600, the server unit 500 operates the service application section 558 of the CPU 550 to generate application completion notifying information for controlling the terminal unit 400 to notify the registration completion information. At this time, the service application section 558 transmits the application completion notifying information to the terminal unit 400 together with the terminal specific information for identifying the terminal unit 400 (Step S321).

When receiving the information transmitted from the server unit 500 (Step S322) and recognizing the application completion notifying information, the terminal unit 400 notifies information that indicates that the application has been completed based on the application completion notifying information. Specifically, the processor 430 recognizes, based on the application completion notifying information, content information of the additional service of which the application has been completed, the parking information to which the additional service has been applied for, and the estimated parking arrival time. Then, the processor 430 displays on the terminal display section 140 the information for notifying that the application for the additional service has been completed. Further, the guidance notifier 192A notifies the completion of the application by sound from the sound output section 150 (Step S323).

Thereafter, the processor 430 operates the guidance notification controller 192 to provide notification for asking the user whether or not to apply for another additional service application or to cancel or to modify the service application. When recognizing request information regarding additional service application set by the user's input operation, the processor 430 returns to Step S316 to generate service application request information.

On the other hand, when not recognizing request information regarding additional service application, the processor 430 performs processing of Steps S314 and S315 and provide navigation for the travel route to the parking lot on the terminal display section 140.

(Parking Lot Search Processing)

Figure 24:
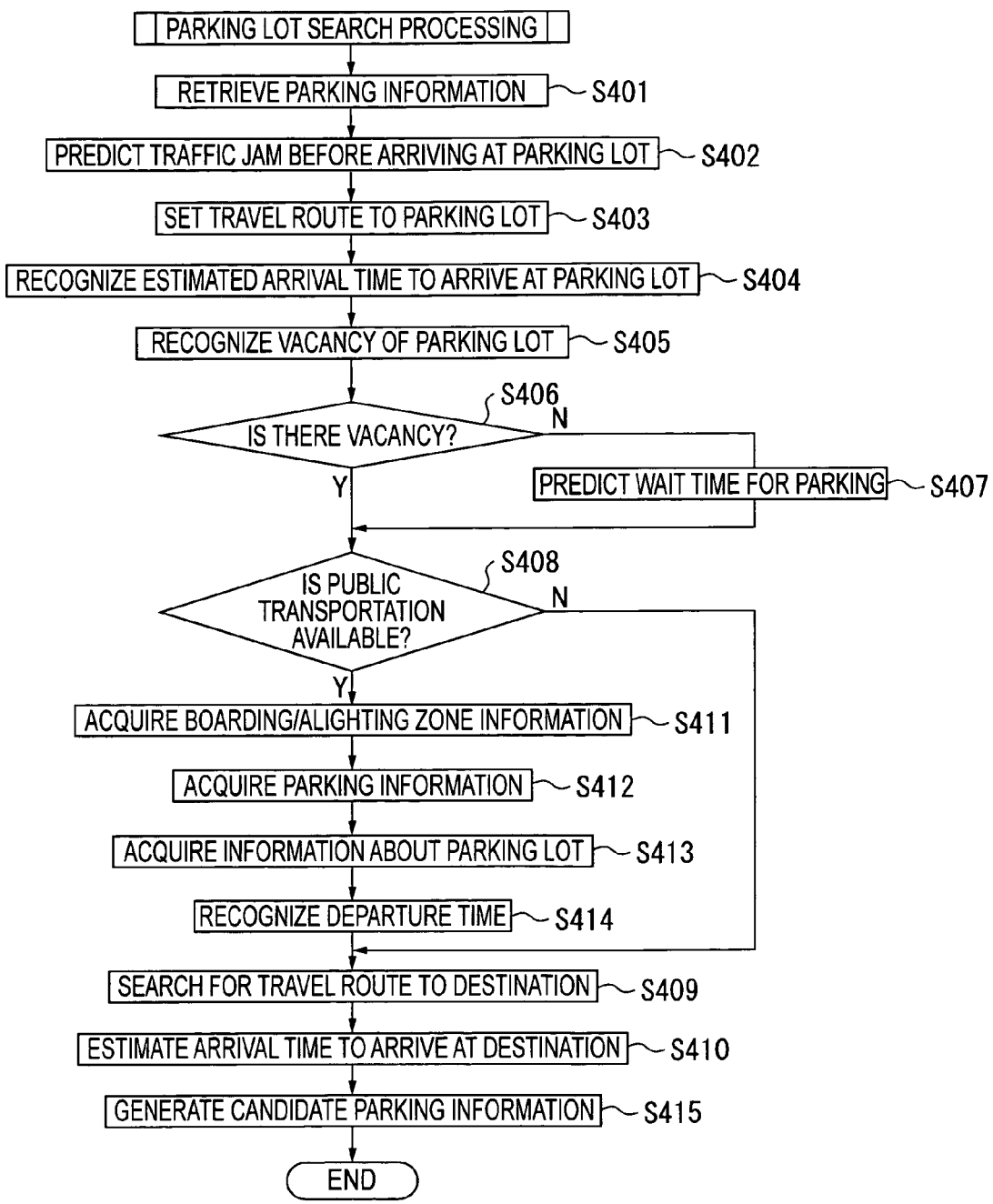
FIG. 24 is a flow chart showing parking lot search processing according to the second embodiment.

Next, parking lot search processing will be described with reference to FIG. 24. In the parking lot search processing in FIG. 24, the destination information, the current position information and the like are acquired from the various information received by the terminal unit 400 in the route search processing. Then, the CPU 550 operates the information retriever 556 to retrieve the parking information of parking lots located near the destination (e.g., the parking information located within a predetermined distance from the destination) (Step S401) based on the destination information to store it in the storage unit 540 as candidate parking information.

Then, the traffic-jam condition recognizer 553A of the traffic condition recognizer 553 of the CPU 550 recognizes change over time of the traffic-jam based on the time-series data 12*i* and generates the traffic-jam prediction information (Step S402). Thereafter, the route searcher 555A of the route processor 555 searches for a travel route to each of the parking lots to obtain candidate travel route information to the parking lot (Step 403). Incidentally, in searching for the travel routes, the route search processing may be performed by taking account of traffic-jam prediction, where an arrival position of the vehicle at a predetermined time is computed and a travel route is searched for by avoiding a predicted traffic-jam zone shown in the traffic-jam prediction information generated in Step S402.

Then, the CPU 550 operates the travel time computing section 555C to compute a travel distance from the current position of the vehicle to each of the parking lots for each candidate travel route information to the parking lot obtained in Step S403 to generate travel distance information. The travel time computing section 555C further computes a travel time required to travel each of the travel distances to generate estimated parking arrival time information to arrive at the parking lots (Step S404).

The CPU 550 associates the candidate travel route information, the travel time information and the estimated parking arrival time information acquired or generated in Steps S402 to S404 with each of the parking information of the candidate parking information having been stored in the storage unit 540, the associated information each being stored.

Next, the CPU 550 operates the parking condition recognizer 553B to generate the current parking condition information and parking vacancy prediction information about vacancy of each of the parking lots (Step S405). Specifically, the parking condition recognizer 553B acquires VICS information from the information received via the interface 510 to generate the current parking condition information based on the vacancy of each parking lot contained in the VICS data. Also, the parking condition recognizer 553B recognizes change over time of the vacancy of the parking lot based on the time-series data 12*i* to generate parking vacancy prediction information. Then, the CPU 550 recognizes the parking condition information at a time when the vehicle arrives at the parking lot based on the current parking condition information and the parking vacancy prediction information (Step S406).

Herein, when determining that there is not vacancy in the parking lot, the CPU 550 estimates a wait time for a vacant space of the parking lot based on the time-series data 12*i* to acquire the wait time information (Step S407).

Then, the CPU 550 associates the vacancy information and the wait time information with the parking information, which is added to the candidate parking information in the storage unit 540.

The information retriever 556 of the processor 550 retrieves a boarding/alighting zone of the public transportation near the destination, e.g., within a predetermined distance from the destination (Step S408). Specifically, the information retriever 556 retrieves a boarding/alighting zone of a public transportation located near the destination based on the public transportation information table 30 to retrieve boarding/alighting zone information 34 about the boarding/alighting zone.

When there is no boarding/alighting zone of the public transportation near the destination, the route searcher 555A of the CPU 550 searches for travel routes from the parking lots to the destination and acquires candidate travel route information (Step S409). At the same time, the travel setting section 555B of the CPU 550 sets travel means to the destination. Specifically, the travel setting section 555B recognizes travel means information about travel means such as "walk", "bicycle" and "taxi", which is acquired by the user's input operation.

Then, the travel time computing section 555C of the CPU 550 computes travel distances from the parking lots to the destination based on the map information to acquire the travel distance information. The travel time computing section 555C computes travel times from the parking lots to the destination based on the travel means information recognized by the travel setting section 555B to generate estimated destination arrival time information about estimated times to arrive at the destination (Step S410). The travel time computing section 555C computes travel distance information for each of the candidate travel route information and generates estimated destination arrival time information for each of the travel means information.

On the other hand, when it is recognized, in Step S408, that three is an available boarding/alighting zone of a public transportation such as a railway station and a bus stop near the destination, the CPU 550 operates the information retriever 556 to retrieve another boarding/alighting zone on a line of the public transportation having the said available boarding/alighting zone (Step S411). For instance, as shown in FIG. 11, the information retriever 556 retrieves the public transportation near the destination and acquires station B of railway C, and further acquires public transportation information 31 of station A on the line of railway C. Then, based on the map information, the information retriever 556 retrieves parking information about a parking lot near the boarding/alighting zone information 34 acquired in Step S411 (Step S412). For instance, in FIG. 11, the information retriever 556 recognizes parking lot P-a near station A and acquires parking information 21 about parking P-a.

The CPU 550 further performs processing of Step S402 to Step S407 also for this parking information. Specifically, the CPU 550 acquires the traffic jam prediction information based on the time-series data 12*i*, acquires the candidate travel route information to the parking lot, and generates travel distance information and the estimated parking arrival time information about the candidate travel route information. Further, the information retriever 556 generates vacancy information about vacancy of the parking lot and generates wait time information about wait time of the parking lot. Then, the processor 430 associates the candidate travel route information, the travel distance information, the estimated parking arrival time information, the vacancy information and the wait time information with the parking information 21, which is added to the candidate parking information in the storage unit 540 (Step S413). The processor 430 recognizes timetable information 33 of the public transportation information 31 (Step S414).

Thereafter, the processor 430 performs the processing of Steps S409 and S410. Specifically, the route searcher 555A of the processor 430 acquires candidate travel route information about the travel routes from the parking lots in the parking information 21 contained in the candidate parking information to the destination. Then, the travel time computing section 555C of the CPU 550 computes travel distance information about travel distances based on the candidate travel route information. The travel setting section 555B of the CPU 550 retrieves travel means from the parking lots to the destination, such as "walk", "bicycle", "bus" and "railway" and generates travel means information about available travel means. Then, based on the travel means information, the processor 430 computes the travel times from the respective parking lots to the destination and acquires estimated destination arrival time information about estimated arrival times at the destination. Incidentally, the candidate travel route information to the destination, the travel distance information thereof and the estimated destination arrival time information are associated with the parking information 21, which is then added to the candidate parking information stored in the storage unit 540 (Step S415).

(Service Application Processing)

Next, additional service application processing will be described with reference to FIG. 25.

Figure 25:
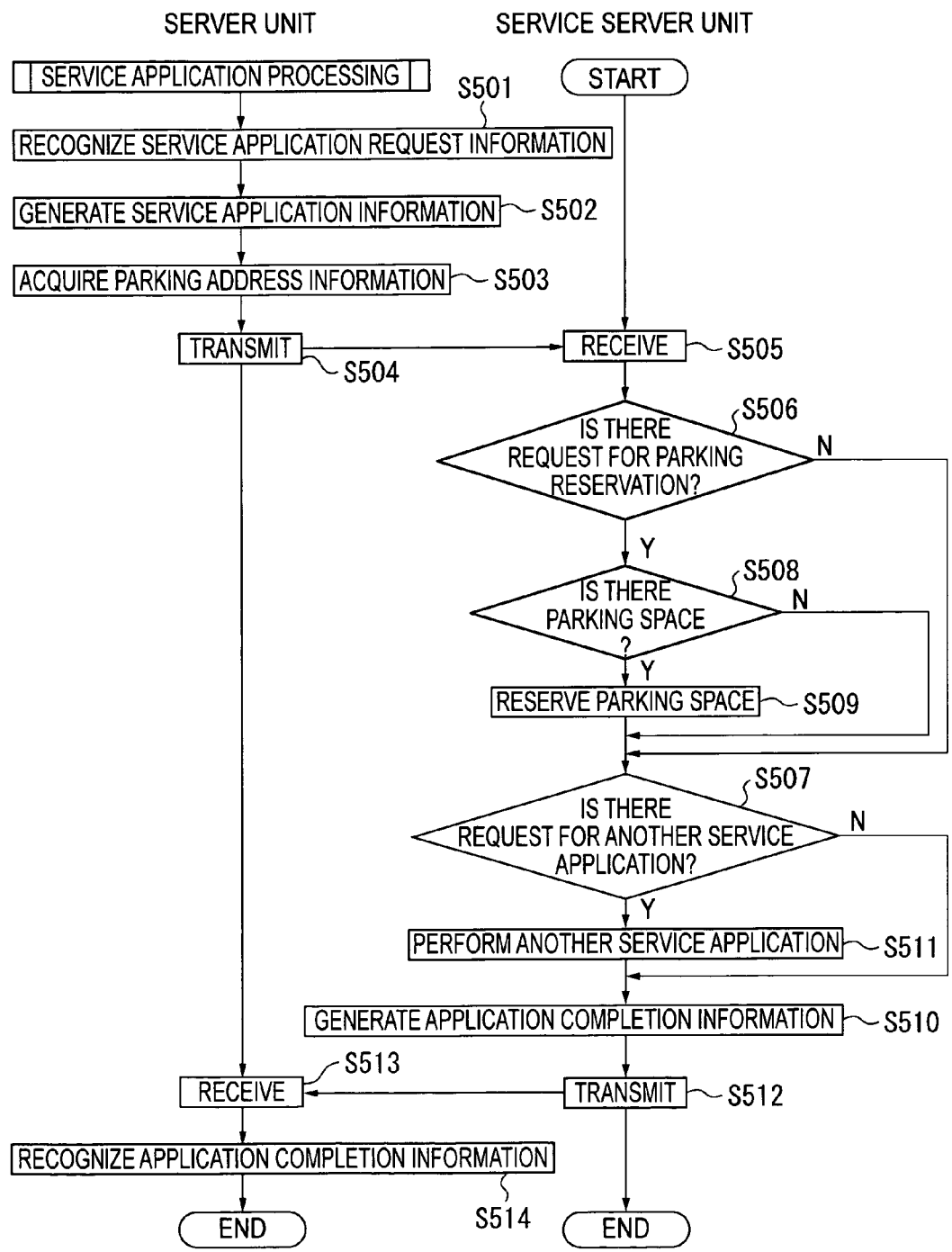
FIG. 25 is a flowchart showing service application processing according to the second embodiment.

Referring to FIG. 25, the server unit 500 first receives the various information transmitted from the terminal unit 400. Then, the CPU 550 recognizes the service application request information contained in the various information (Step S501).

The CPU 550 recognizes the personal information of the user of the terminal unit 400 that requests the application for the service, the parking information 21 about the parking lot to which the additional service is applied for, the information about the additional service to be applied for, and the like, which are contained in the recognized service application request information. The CPU 550 recognizes the estimated parking arrival time information computed in the parking lot search processing and stored in the storage unit 540. Then, based on the personal information of the user, the parking information 21, the information about the additional service, the estimated parking arrival time information and the like, the CPU 550 generates the service application information (Step S502).

The CPU 550 recognizes the parking ID 22 from the parking information 21 and retrieves the parking address information for identifying the parking lot corresponding to the parking ID 22 (Step S503). Then, the CPU 550 controls the interface 510 to transmit the service application information to the service server unit 600 installed in the parking lot to which the additional service is to be applied for, based on the parking address information acquired in Step S503 (Step S504).

When the service server unit 600 receives information transmitted from the server unit 500 (Step S505), the service application recognizer 662 of the service server processor 660 recognizes the service application information.

The service application recognizer 662 of the service server processor 600 recognizes the information about the additional service from the service application information to determine whether or not there is information for requesting reservation of the parking lot (Step S506). When there is no information for requesting the reservation of the parking lot, the service application recognizer 662 recognizes whether or not the information about the additional service contains another additional service to be applied for (Step S507).

On the other hand, when there is information for requesting reservation of the parking lot in Step S506, the parking condition recognizer 661 of the service server processor 660 recognizes the parking condition information (Step S508). Then, the parking condition recognizer 661 recognizes that there is no vacant parking space, reservation for a parking space is not registered. Incidentally, in this case, the service server processor 660 may generate notification information for requesting to notify that there is no available parking space for reservation and transmit the information to the server unit 500.

In Step S508, when the parking condition recognizer 661 recognizes that there is a vacant parking space, the parking condition recognizer 661 acquires a parking space ID of the vacant parking space. Then, the parking condition recognizer 661 adds information indicating that the parking space has been reserved to the parking condition information 52 corresponding to the acquired parking space ID 51 in the parking condition information table 50. The service registration section 663 of the service server processor 660 generates the service reservation information 71 based on the personal information of the service application information recognized by the service application recognizer 662, the estimated arrival time information, the information about the additional service and the parking space ID 51 of which the parking space has been reserved (Step S509).

Next, processing of Step S507 is performed, where the service registration section 663 recognizes whether or not the information for applying for the additional service is contained. When the service application recognizer recognizes that the information about the additional service does not contain another service content information, the service registration section 663 generates application completion information for notifying that the application of the additional service has been completed (Step S510).

On the other hand, in Step S507, when the service application recognizer 662 recognizes that the information about the additional service contains other service content information, the service registration section 663 recognizes the service content information 62 that corresponds to this information about the additional service based on the service content information table 60 to acquire the service ID 61. Then, the service registration section 663 of the service server processor 660 adds the acquired service ID 62 to the service ID 73 of the service reservation information 71 generated in Step S509 (Step S511). The service server processor 660 stores the service reservation information 71 in the service reservation information table 70 of the storage section 630. Note that the information about the additional service recognized in Step S507 may not be limited to the registration of the additional service, but may be information for canceling the additional service, information for modifying the additional service and the like. In such case, the service registration section 663 may delete a service ID of a subjected additional service from the service ID 73 of the service reservation information 71 or may delete the service reservation information 71 itself. When the information for canceling the reservation of the parking lot is contained, the service registration section 663 deletes the information contained in the parking reservation information 76. In addition, the service registration section 663 adds information indicating vacancy to the parking condition information 52 corresponding to a subjected parking space ID 51 and updates the parking condition information table 50.

Thereafter, the service server processor 660 performs processing of Step S510 to generate the application completion information and controls the network interface 610 to transmit the application completion information to the server unit 500 (Step S512).

When the server unit 500 receives the information transmitted from the service server unit 600 (Step S513), the service application section 558 of the CPU 550 recognizes the application completion information from the transmitted information (Step S514).

Advantage of Second Embodiment

In the navigation system 200 of the second embodiment as described above, when recognizing from the terminal unit 400 the request information for requesting the route search processing to the destination, the server unit 500 retrieves parking information for a plurality of parking lots and sets travel routes from the current position of the vehicle to the parking lots and travel routes from the parking lots to the destination. The travel routes are transmitted to the terminal unit 400 and displayed on the terminal display section 140 of the terminal unit 400. Thus, since the travel routes to the parking lots near the destination and the travel routes from the parking lots to the destination can be searched for and displayed as in the first embodiment, conventional processing for retrieving parking lots after arriving at the destination is not necessary. Therefore, complicated retrieval operation is not necessary, providing proper navigation for the vehicle.

When the server unit 500 recognizes from the terminal unit 400 the service application request information for applying for the additional service, the service application section generates the service application information, which is transmitted to the service server unit. Accordingly the user can easily apply for the additional service at the terminal unit 400.

According to the second embodiment, the server unit 500 stores the map information and the traffic condition prediction table 10 used for the traffic-jam prediction, the traffic condition prediction table 10 having relatively large data volume. Accordingly, the arrangement of the terminal unit 400 can be simplified. In addition, the map information and the traffic condition prediction table 10 are updated in the server unit 500, and the updated information can shared with the terminal unit 400. Accordingly, the navigation system 200 can be improved in terms of the maintenance and management ability and the operation ability. In addition, the terminal units 400 can appropriately acquire the most updated information and provide proper navigation according to the most updated information, thereby improving the usability.

The server unit 500 storing the map information and the traffic condition prediction table 10 searches for the travel route and delivers the travel route to the terminal unit 400. With the arrangement, the processing load of the terminal unit 400 can be reduced. In other words, the terminal unit 400 is not required to have a large processing capacity, so that the arrangement of the terminal unit 400 can be simplified, which may be, for example, realized as a portable phone. Thus, the size and the cost of the terminal unit can be reduced, thereby easily promoting wider use thereof.

Since the processor 190 of the terminal unit 400 and the CPU 550 of the server unit 500 are configured as programs, the use of the map information is facilitated and thereby promoting wider use thereof. The programs may be stored on a recording medium in a manner readable by a computing section, i.e., a computer. With the arrangement, the use of the map information can be facilitated and the programs can be easily handled, thereby further expanding the use thereof. The computing section may not necessarily be a single computer but may be a plurality of computers connected over a network, elements such as a CPU and a microcomputer, or a circuit board on which a plurality of electronic parts are mounted.

Modification of Embodiment

The present invention is not limited to the above-described specific embodiments, but includes modifications as long as the object of the present invention can be attained.

Although the terminal unit 400 is used as the navigation device 100 (navigation system 200) and the terminal unit 400 in the embodiments described above, the arrangement is not limited thereto. For example, the navigation device 100 and the terminal unit 400 may be so arranged as to be carried by the user, which may be a portable phone, a PHS (Personal Handyphone System), a portable personal computer and the like. In any case, as described above, the present invention is most effectively applicable to a mobile body to which traffic jams can be an obstacle to the travel thereof.

While the current position recognizer recognizes the current-position information based on the data output from the various sensors and the GPS data output from the GPS receiver in the above embodiments, other methods may be used for recognizing the current position of the mobile body. As described above, the current position recognizer may recognize the simulated current position input at the terminal input section 130 as the current position.

While the functions are realized in the form of programs in the above description, the functions may be realized in any form including hardware such as a circuit board or elements such as an IC (Integrated Circuit). In view of easy handling and promotion of the use, the functions are preferably stored and read from programs or recording media.

Although the route processor 195 sets the travel route based on the traffic-jam prediction information on the basis of the time-series data 12*i*, the arrangement is not limited thereto. For example, the route processor may generate the travel route information based only on the current traffic-jam information, and the route searcher may generate the travel route information based also on the traffic-jam prediction information only when desired by the user. In such case, no load is applied to the processor 190 in generating the travel route information, thus realizing quicker processing.

Although the parking condition recognizer 194B of the traffic condition recognizer 194 estimates the wait time at the parking lot based on the time-series data 12*i*, the arrangement is not limited thereto. For instance, the service server unit installed in each of the parking lots may obtain an average parking time of vehicles to generate statistical parking processing information that is obtained by statistically processing the average parking time on time basis, the statistical parking processing information being used to estimate the wait time. In such case, the processor of the navigation device may transmit to the service server unit request information for requesting wait time information at a predetermined time or for a predetermined time period. Then, the service server unit, in response to the time information or the time period information contained in the request information, generates wait time information of the parking lot at the predetermined time, which is then transmitted to the navigation device. With such arrangement, the navigation device can acquirer detailed wait time of each of the parking lots, thus providing more accurate parking information.

In the second embodiment, the parking condition recognizer 553B generates the current parking condition information based on the VICS data and the parking vacancy prediction information based on the time-series data 12$i$, but the arrangement is not limited thereto. For instance, the parking space sensor of the sensor 620 in the service server unit 600 installed in each of the parking lots may recognize the vacancy of each of the parking lot and transmit it to the server unit 500 so that the server unit 500 can recognize the current parking condition information. Alternatively, the entrance sensor of the service server unit 600 may count the number of vehicles entering/exiting from the parking lot and compute an average parking time of vehicles, and the server unit 500 may estimate rate of vacancy of the parking lot or a wait time of the parking lot in order to generate the parking vacancy prediction information based on the average parking time. By generating the current parking condition information and the parking vacancy prediction information based on the actual parking condition with the service server unit 600, the parking condition information can be securely notified.

The navigation device 100 or the terminal unit 400 may be removably installed in the vehicle. In such case, the user can carry the guidance notifier or the terminal display section even after parking the vehicle in the parking lot, continuous navigation can be provided to the user until arriving at the destination. Further, the navigation device 100 and the terminal unit 400 may be so arranged as to be connected to a portable device such as a portable phone, so that the portable device may take over the map information and the travel route information. With such arrangement, the travel route may be continuously notified until arriving at the destination as described above. In addition, the portable device with good portability can be employed, which is preferable to carry.

Still further, when an additional service such as a courtesy discount ticket of an event site is reserved at the time of retrieving the parking lot with the navigation device, the information about the reservation of the additional service may be transferred to the portable device. With the arrangement, since the information about the reservation of the additional service can be transferred to the portable device, the information can be read out promptly when the information is required in the event site.

Although information about the parking fee is listed in the parking list in the first and second embodiments described above, other service information of the parking lot may also be listed. For instance, information about the scale of the parking lot (i.e., the size, the number of floors, height of ceiling, etc.), information about entrance and exit of the parking lot (i.e., the size and the number of entrances and exits, the size or the traffic density of a road facing the entrance and exit, etc.), information about parking spaces, opening hour and the like. may be listed for each of the parking lots. In addition, information about the parking method, such as whether the user parks the vehicle by himself/herself or a keeper of the parking lot assists the parking, and whether the vehicle has to be parked backward or in-line, may also be listed in detail.

As described above, by listing the scale of the parking lot in the parking list, when the user selects a parking lot that is located near the destination and predicted to be congested, the user can select a large parking lot or a multilevel parking lot with many floors. Such large parking lot or multilevel parking lot with many floors are less likely to be full, and even when the user has to wait, the wait time may be long. Further, by listing the information about the height of the ceiling in the parking information in the parking list, even when the vehicle of the user is a large-size car with large height, the user can select a parking lot that is available for the large-size car.

By listing the information about the entrance and exit of the parking lots, the user can refer to the size of the entrance and exit, the numbers of entrances and exits and the condition of the road facing the entrance and exit in selecting a parking lot near the destination or near a station where congestion is predicted. Accordingly, the user can check a parking lot with a large entrance and exit, with larger number of entrances and exits or with an entrance and exit facing a road with light traffic density in selecting a parking lot. By selecting the parking lot with the large entrance and exit, with large number of entrances and exits or with the entrance and exit facing the road with light traffic density, the user can avoid congestion at the entrance and exit of the parking lot.

With the arrangement in which the information about the parking spaces is listed in the parking list, the user can select, for instance, a parking lot where the user can park the vehicle with ease. With the arrangement in which the opening hour is listed in the parking list, when, for instance, the user desires to park the vehicle at night, the user can select a parking lot with later close time.

Further by listing the information about the parking method, e.g., whether the user drives the vehicle backward to park the vehicle in parallel or to park in-line and whether or not the keeper parks the vehicle instead of the user, the user can avoid a parking lot with the parking method that the user does not prefer.

As described above, by listing the service information of parking lots in detail, the user can easily check the service information and select a desired parking lot.

Although the service server unit 600 is installed in each of the parking lots in the second embodiment, the arrangement is not limited thereto. For instance, the service server unit 600 may be installed only in a large-scale parking lot. In such case, one service server unit manages a plurality of parking lots and transmits to the server unit the service information and the additional service information of the plurality of parking lots.

The specific structures and the operating procedures for the present invention may be appropriately modified as long as the scope of the present invention can be attained.

Advantage of Embodiment

As described above, in the above-described embodiments, the navigation device 100 acquires the map information, the current position information about the current position and the destination information about the destination and operates the information retriever 196 to retrieve the parking information about the parking lots near the destination based on the map information. Then, the route searcher 195A of the route processor 195 sets the travel routes from the current position to the parking lots and the travel routes from the parking lots to the destination, these travel routes and the locations of the parking lots being superimposed on the map information and displayed on the terminal display section 140. Thus, since the travel routes to the parking lots near the destination and the travel routes from the parking lots to the destination can be searched for and displayed, conventional processing for retrieving parking lots after arriving at the destination is not necessary. Therefore, proper support for the travel of the vehicle can be provided.

INDUSTRIAL APPLICABILITY

The present invention can be applied to a guidance notifying device for notifying a traffic condition of a mobile body, its system, its method, a program executing the method, and a recording medium storing the program.

The invention claimed is:

1. A guidance notifying device, comprising:
a map information acquirer for acquiring map information;
a current position acquirer for acquiring current position information about a current position of a mobile body;
a destination acquirer for acquiring destination information about a destination;
a facility information acquirer for acquiring plural pieces of facility information about accommodating facilities that accommodate the mobile body based on the map information;
a service information acquirer for acquiring service information about service content of the accommodating facilities;
a route setting section for setting first travel routes from the current position to the accommodating facilities and second travel routes from the accommodating facilities to the destination; and
a notification controller for controlling a notifier to notify one of the accommodating facilities and at least one of the first and the second travel routes based on the first and the second travel routes, wherein
the service information acquirer acquires entrance number information about the number of entrances of the accommodating facilities; and
the notification controller selects one of the accommodating facilities based on the entrance number information.

2. The guidance notifying device according to claim 1, wherein the facility information acquirer acquires facility information about accommodating facilities located within a predetermined distance from the destination.

3. The guidance notifying device according to claim 1, further comprising:
a public transportation information acquirer for acquiring public transportation information about a public transportation, wherein
the facility information acquirer acquires facility information about an accommodating facility located near a boarding/alighting zone of a first public transportation that has another boarding/alighting zone near the destination or an accommodating facility located near a boarding/alighting zone of a second public transportation that is transitable to the first public transportation, and
the route setting section sets a travel route including the public transportations.

4. The guidance notifying device according to claim 3, further comprising:
a transportation fee information acquirer for acquiring transportation fee information about a transportation fee of a public transportation that is required when traveling the travel route including the public transportation.

5. The guidance notifying device according to claim 3, further comprising:
transportation fee information acquirer for acquiring transportation fee information about a transportation fee of a public transportation that is required when traveling the travel route including the public transportation, and
the notification controller displays the transportation fee together with the accommodating facility and at least one of the first and second travel routes.

6. The guidance notifying device according to claim 1, further comprising:
a traffic information recognizer for recognizing traffic information about a traffic condition;
a statistical traffic information acquirer for acquiring statistical traffic information that is obtained by statistically processing traffic conditions in the past based on time factors; and
a traffic-jam-condition change recognizer for recognizing a change over time in the traffic condition based on the statistical traffic information, wherein
the route setting section sets a travel route in accordance with the traffic information and the change over time in the traffic condition.

7. The guidance notifying device according to claim 1, further comprising:
a travel distance computing section for computing a first travel distance about a distance of each of the first travel routes and a second travel distance about a distance of each of the second travel routes, wherein
the notification controller selects one of the accommodating facilities based on the first and second travel distances.

8. The guidance notifying device according to claim 7, wherein the notification controller selects an accommodating facility such that a total distance of the first and second travel distances becomes short.

9. The guidance notifying device according to claim 7, wherein the notification controller selects an accommodating facility such that the second travel distance becomes short.

10. The guidance notifying device according to claim 1, further comprising:
a time computing section for computing a first travel time required for traveling each of the first travel routes and a second travel time required for traveling each of the second travel routes, wherein
the notification controller selects one of the accommodating facilities based on the first and second travel times.

11. The guidance notifying device according to claim 10, wherein
the time computing section computes an estimated arrival time to arrive at the destination based on the first and second travel times, and
the notification controller selects an accommodating facility with an early estimated arrival time.

12. The guidance notifying device according to claim 1, further comprising:
a facility accommodation condition recognizer for acquiring accommodation condition information about accommodation conditions of the accommodating facilities, wherein
the notification controller selects one of the accommodating facilities based on the accommodation condition information.

13. The guidance notifying device according to claim 1, wherein
the service information acquirer acquires utilization fee information about utilization fees required for utilizing the accommodating facilities, and
the notification controller selects an accommodating facility requiring a low utilization fee.

14. The guidance notifying device according to claim 1, wherein
the service information acquirer acquires facility scale information about scales of the accommodating facilities, and
the notification controller selects an accommodating facility with a large scale.

15. The guidance notifying device according to claim 1, wherein
the service information acquirer acquires accommodation space information about a size of an accommodation space for accommodating a mobile body
the notification controller selects an accommodating facility with a large accommodation space with higher priority.

16. The guidance notifying device according to claim 1, wherein
the service information acquirer acquires available time information about available times of the accommodating facilities, and
the notification controller selects an accommodating facility with a long available time.

17. The guidance notifying device according to claim 1, wherein
the service information acquirer acquires accommodation method information about accommodation methods for accommodating a mobile body in the accommodating facilities, and
the notification controller gives priorities to accommodation methods for accommodating the mobile body in accommodation spaces of the accommodating facilities, the notification controller selecting an accommodating facility with an accommodation method to which a high priority is given.

18. The guidance notifying device according to claim 1, further comprising:
an additional service information acquirer for acquiring additional service information about additional service content of the accommodating facilities, wherein
the notification controller controls the notifier to notify the additional service information together with the accommodating facilities and at least one of the first and second travel routes.

19. A guidance notifying system, comprising:
a server unit that stores map information in a storage section; and
a terminal unit including a guidance notifying device, the terminal unit acquiring the map information from the server unit via a network, wherein
the guidance notifying device includes:
a map information acquirer for acquiring map information;
a current position acquirer for acquiring current position information about a current position of a mobile body;
a destination acquirer for acquiring destination information about a destination;
a facility information acquirer for acquiring plural pieces of facility information about accommodating facilities that accommodate the mobile body based on the map information;
a service information acquirer for acquiring service information about service content of the accommodating facilities;
a route setting section for setting first travel routes from the current position to the accommodating facilities and second travel routes from the accommodating facilities to the destination; and
a notification controller for controlling a notifier to notify one of the accommodating facilities and at least one of the first and second travel routes based on the first and the second travel routes, wherein
the service information acquirer acquires entrance number information about the number of entrances of the accommodating facilities; and
the notification controller selects one of the accommodating facilities based on the entrance number information.

20. The guidance notifying system according to claim 19, further comprising:
a service server unit that is connected with the server unit via a network, the service server unit receiving service request information about reservation or cancellation of reservation of services of the accommodating facilities, the service request information transmitted from the terminal unit.

21. A guidance notifying system, comprising:
a terminal unit including a guidance notifying device according to claim 1; and
a service server unit that is connected with the terminal unit via a network, the service server unit receiving service request information about reservation or cancellation of reservation of services of the accommodating facilities, the service request information transmitted from the terminal unit,
wherein the guidance notifying device includes:
a map information acquirer for acquiring map information;
a current position for acquirer for acquiring current position information about a current position of a mobile body;
a destination acquirer for acquiring destination information about a destination;
a facility information acquirer for acquiring plural pieces of facility information about accommodating facilities that accommodate the mobile body based on the map information;
a route setting section for setting first travel routes from the current position to the accommodating facilities and second travel routes from the accommodating facilities to the destination; and
a notification controller for controlling a notifier to notify one of the accommodating facilities and at least one of the first and the second travel routes based on the first and the second travel routes.

22. The guidance notifying system according to claim 20, wherein
the terminal unit includes:
an additional service information acquirer for acquiring additional service information about additional services provided by the accommodating facilities;
a service request information generator for generating service request information for requesting reservation or cancellation of reservation of the services provided by the accommodating facilities; and
a transmitter for transmitting the service request information.

23. The guidance notifying system according to claim 21, wherein
the terminal unit includes:
an additional service information acquirer for acquiring additional service information about additional services provided by the accommodating facilities;
a service request information generator for generating service request information for requesting reservation or cancellation of reservation of the services provided by the accommodating facilities; and
a transmitter for transmitting the service request information.

24. The guidance notifying system according to claim 20, wherein
the service server unit includes a managing accommodation condition recognizer for recognizing accommodation condition information about an accommodation condition of an accommodating facility that is managed by the service server unit.

25. The guidance notifying system according to claim 21, wherein
the service server unit includes a managing accommodation condition recognizer for recognizing accommodation condition information about an accommodation condition of an accommodating facility that is managed by the service server unit.

26. A guidance notifying method, comprising:
acquiring map information, current position information about a current position of a mobile body, and destination information about a destination;
acquiring plural pieces of facility information about accommodating facilities for accommodating the mobile body based on the map information;
acquiring service information about service content of the accommodating facilities;
setting a first route from the current position to each of the accommodating facilities and a second route from each of the accommodating facilities to the destination; and
notifying with a notifier one of the accommodating facilities and at least one of the first travel route and the second travel route based on the first travel route and the second travel route,
wherein the acquiring of service information involves acquiring entrance number information about the number of entrances of the accommodating facilities; and
the notifying involves selecting one of the accommodating facilities based on the entrance number information.

27. A guidance notifying program for operating a computing unit as a guidance notifying device, wherein
the guidance notifying device includes:
a map information acquirer for acquiring map information;
a current position for acquirer for acquiring current position information about a current position of a mobile body;
a destination acquirer for acquiring destination information about a destination;
a facility information acquirer for acquiring plural pieces of facility information about accommodating facilities that accommodate the mobile body based on the map information;
a service information acquirer for acquiring service information about service content of the accommodating facilities;
a route setting section for setting first travel routes from the current position to the accommodating facilities and second travel routes from the accommodating facilities to the destination; and
a notification controller for controlling a notifier to notify one of the accommodating facilities and at least one of the first and the second travel routes based on the first and the second travel routes, wherein
the service information acquirer acquires entrance number information about the number of entrances of the accommodating facilities; and
the notification controller selects one of the accommodating facilities based on the entrance number information.

28. A guidance notifying program for operating a computing unit to perform a guidance notifying method,
the guidance notifying method includes:
acquiring map information, current position information about a current position of a mobile body, and destination information about a destination;
acquiring plural pieces of facility information about accommodating facilities for accommodating the mobile body based on the map information;
acquiring service information about service content of the accommodating facilities;
setting a first route from the current position to each of the accommodating facilities and a second route from each of the accommodating facilities to the destination; and
notifying with a notifier one of the accommodating facilities and at least one of the first travel route and the second travel route based on the first travel route and the second travel route, wherein
the acquiring of service information involves acquiring entrance number information about the number of entrances of the accommodating facilities; and
the notifying involves selecting one of the accommodating facilities based on the entrance number information.

29. A recording medium that stores a guidance notifying program in a manner readable by a computing unit, wherein
the guidance notifying program operates the computing unit to function as a guidance notifying device, and
the guidance notifying device includes:
a map information acquirer for acquiring map information;
a current position acquirer for acquiring current position information about a current position of a mobile body;
a destination acquirer for acquiring destination information about a destination;
a facility information acquirer for acquiring plural pieces of facility information about accommodating facilities that accommodate the mobile body based on the map information;
a service information acquirer for acquiring service information about service content of the accommodating facilities;
a route setting section for setting first travel routes from the current position to the accommodating facilities and second travel routes from the accommodating facilities to the destination; and
a notification controller for controlling a notifier to notify one of the accommodating facilities and at least one of the first and the second travel routes based on the first and the second travel routes, wherein
the service information acquirer acquires entrance number information about the number of entrances of the accommodating facilities; and
the notification controller selects one of the accommodating facilities based on the entrance number information.

30. A recording medium that stores a guidance notifying program in a manner readable by a computing unit, wherein
the guidance notifying program operates the computing unit to execute a guidance notifying method, and
the guidance notifying method includes:
acquiring map information, current position information about a current position of a mobile body, and destination information about a destination;
acquiring plural pieces of facility information about accommodating facilities for accommodating the mobile body based on the map information;
acquiring service information about service content of the accommodating facilities;
setting a first route from the current position to each of the accommodating facilities and a second route from each of the accommodating facilities to the destination; and
notifying with a notifier one of the accommodating facilities and at least one of the first travel route and the second travel route based on the first travel route and the second travel route, wherein the acquiring of service information involves acquiring entrance number information about the number of entrances of the accommodating facilities, and the notifying involves selecting one of the accommodating facilities based on the entrance number information.

* * * * *

UNITED STATES PATENT AND TRADEMARK OFFICE
CERTIFICATE OF CORRECTION

| | | |
|---|---|---|
| PATENT NO. | : 7,860,647 B2 | |
| APPLICATION NO. | : 11/630518 | |
| DATED | : December 28, 2010 | |
| INVENTOR(S) | : Kouji Amano | |

It is certified that error appears in the above-identified patent and that said Letters Patent is hereby corrected as shown below:

On the Title page:

Item "(73)" "Pioneer Corporation, Tokyo, Japan"

Should read:

Item "(73)" --Pioneer Corporation, Tokyo, Japan
              Increment P Corporation, Tokyo, Japan--

Signed and Sealed this
Eighteenth Day of October, 2011

David J. Kappos
*Director of the United States Patent and Trademark Office*